(12) United States Patent
Hirabayashi

(10) Patent No.: US 6,594,064 B2
(45) Date of Patent: Jul. 15, 2003

(54) ELECTRO-OPTICAL DEVICE, MANUFACTURING METHOD FOR MANUFACTURING ELECTRO-OPTICAL DEVICE, AND ELECTRONIC EQUIPMENT

(75) Inventor: Yukiya Hirabayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 8 days.

(21) Appl. No.: 09/832,198

(22) Filed: Apr. 11, 2001

(65) Prior Publication Data

US 2001/0038485 A1 Nov. 8, 2001

(30) Foreign Application Priority Data

Apr. 19, 2000  (JP) ........................................ 2000-118148

(51) Int. Cl.[7] ................................................ G02F 1/07
(52) U.S. Cl. ........................ 359/253; 359/254; 359/259
(58) Field of Search ................................ 359/253, 254, 359/259, 245, 248, 272; 349/122, 138, 39

(56) References Cited

U.S. PATENT DOCUMENTS 5,432,625 A * 7/1995 Morin et al. ................... 359/59

* cited by examiner

*Primary Examiner*—Jordan M. Schwartz
*Assistant Examiner*—Tim Thompson
(74) *Attorney, Agent, or Firm*—Oliff & Berridge, PLC

(57) ABSTRACT

To prevent the substrate floating effect that is caused when a transistor channel region fabricated of a monocrystal silicon layer covered with an insulator is in a floating state, and to stabilize the electrical characteristics of the transistor. A channel region of a semiconductor layer includes an extension portion. The end of the extension portion is connected to a contact hole. The contact hole is in turn connected to an interconnect line. The interconnect line is configured with one end thereof connected to the contact hole and with the other end connected to a contact hole leading to a light-shielding layer.

17 Claims, 28 Drawing Sheets

(A)

(B)

(C)

(D)

(E)**

(F)**

ELECTRO-OPTICAL DEVICE, MANUFACTURING METHOD FOR MANUFACTURING ELECTRO-OPTICAL DEVICE, AND ELECTRONIC EQUIPMENT

BACKGROUND OF THE INVENTION

1. Field of Invention

The present invention relates to an electro-optical device composed of a semiconductor layer on a substrate, a manufacturing method for manufacturing the electro-optical device, and electronic equipment. In particular, the present invention relates to an electro-optical device having a channel region of the semiconductor layer connected to a light-shielding layer, a manufacturing method for manufacturing the electro-optical device, and electronic equipment.

2. Description of Related Art

The SOI (Silicon On Insulator) technology, which forms a semiconductor of a monocrystal silicon layer on an insulator substrate and then produces a semiconductor element such as a transistor on the semiconductor layer, is advantageous in the implementation of high-speed and power-saving design, and of the high degree of integration into elements. For example, the SOI technology finds applications in a switching element in a TFT array in an electro-optical device such as a liquid-crystal display device.

In typical bulk semiconductor parts, the channel region of a transistor is kept to a predetermined potential through a substrate thereof, and the element is thus free from the electrical characteristic degradation attributed to parasitic bipolar effect resulting from a change in the potential of the channel.

SUMMARY OF THE INVENTION

Since a transistor forming a switching element of a TFT array is completely isolated by an oxide insulator in an electro-optical device such as a liquid-crystal display device, the channel region of the transistor cannot be kept to a predetermined potential unlike a bulk semiconductor transistor. For this reason, the channel region remains electrically floating. In particular, when the transistor has a structure of a monocrystal silicon layer, the mobility of carriers traveling within the channel region is high. Carriers accelerated by the electric field in the vicinity of the drain region of the transistor impact the crystal lattice, leading to a phenomenon called impact ionization. As a result, holes, generated in an N-channel TFT, are accumulated in the bottom portion of the channel. When charges are accumulated in the channel in this way, the NPN structure of the TFT (in case of the N-channel TFT) apparently functions as a bipolar device. An abnormal current lowers the element source-drain withstand voltage, leading to electrical characteristic degradation. A group of phenomena attributed to the electrically floating channel is called a substrate floating effect.

It is an object of the present invention to provide an electro-optical device which stabilizes and improves electrical characteristics of a transistor having a monocrystal silicon layer covered with an insulator layer, by preventing the transistor source-drain withstand voltage from being lowered by the substrate floating effect.

An electro-optical device of one exemplary embodiment of the present invention includes, on a support substrate, a plurality of scanning lines, a plurality of data lines which intersects the plurality of scanning lines, a transistor connected to each of the scanning lines and each of the data lines, a pixel electrode connected to each transistor, an insulator layer, formed beneath a semiconductor layer of the transistor serving as a channel of the transistor, and an electrically conductive light-shielding layer formed between the insulator layer and the support substrate, wherein an extension portion of the semiconductor layer is electrically connected to the light-shielding layer.

Since the channel region of the transistor is connected to the electrically conductive light-shielding layer formed beneath the insulator layer under the semiconductor layer of the transistor in the present invention, the channel region is kept to the potential of the light-shielding layer. No abnormal current flows through the transistor, and the electrical characteristics of the transistor are thus stabilized.

In accordance with another exemplary embodiment of the present invention, the extension portion is preferably connected to the light-shielding layer through an interconnect line that runs through a first contact hole formed in the extension portion and a second contact hole formed in the light-shielding layer. With this arrangement, an existing wiring layer is used as the interconnect line for connecting the extension portion to the light-shielding layer.

This arrangement eliminates the need for arranging a new wiring layer, thereby reducing manufacturing steps.

In accordance with another exemplary embodiment of the present invention, the extension portion is preferably connected to the light-shielding layer through an interconnect line that runs through a first contact hole formed in the extension portion and a second contact hole that penetrates the extension portion in a region including the internal portion of the first contact hole and is formed in the light-shielding layer. This arrangement allows the interconnect line to occupy the smallest possible area, thereby controlling a reduction in the aperture ratio of a light-transmissive region which is important in a transmissive-type liquid-crystal display device.

In accordance with another exemplary embodiment of the present invention, the interconnect line is preferably fabricated of the same layer as the one that forms the data line or the scanning line. Since this arrangement allows the interconnect line to be manufactured together with the data line or the scanning line, the electro-optical device can be produced using a related manufacturing process.

In accordance with another exemplary embodiment of the present invention, the electro-optical device preferably includes a storage capacitor connected to the pixel electrode and formed of the semiconductor layer, a capacitive line fabricated of the same layer as the one that forms the scanning line and running in parallel with the scanning line, and an insulator layer interposed between the semiconductor layer and the capacitive line, wherein either the scanning line or the capacitive line includes a bypass path bypassing the interconnect line. When the storage capacitor is incorporated, this arrangement allows the channel region of the transistor to be connected to the electrically conductive light-shielding layer while efficiently making use of a limited space.

In accordance with another exemplary embodiment of the present invention, the light-shielding layers of the transistors are preferably electrically connected to each other in the direction of the scanning line or in the direction of the data line, or in both the directions of the scanning line and the data line, and are preferably supplied with a predetermined potential. This arrangement controls the potential of the light-shielding layer, thereby preventing variations in the threshold voltage of the transistor formed over the light-shielding layer. The electrical characteristics of the transistor are thus stabilized.

In the above arrangement, preferably, the predetermined potential provided to the light-shielding layer is not higher than the lowest potential applied to the source or the drain of the transistor when the transistor arranged over the light-shielding layer is an N-channel transistor. Preferably, the predetermined potential provided to the light-shielding layer is not lower than the highest potential applied to the source or the drain of the transistor when the transistor arranged over the light-shielding layer is a P-channel transistor. Since electrons or holes generated in the channel with the transistor being driven flow to the light-shielding layer through the extension portion, the potential of the channel region is stabilized. This arrangement controls the substrate floating effect of the transistor, thereby preventing a drop in the withstand voltage of the transistor.

In accordance with another exemplary embodiment of the present invention, the thickness of the semiconductor layer preferably ranges from 100 to 180 nm. The semiconductor layer thicker than 100 nm allows the transistor to operate in a partial depletion mode. With the semiconductor layer connected to the light-shielding layer, the potential of the channel region is stabilized. The semiconductor layer thinner than 180 nm controls, to the minimum possible height, a step in the element substrate due to the semiconductor layer thickness. As a result, this arrangement controls disclination when the liquid crystal is aligned, thereby keeping an image quality in a good state.

Further, an exemplary manufacturing method for manufacturing an electro-optical device of another exemplary embodiment of the present invention, includes (a) a step of fabricating a light-shielding layer on a substrate, (b) a step of fabricating an insulator layer on the light-shielding layer, (c) a step of fabricating, on the insulator layer, a semiconductor layer that forms a channel region of a transistor, an extension portion of the channel region, and one electrode of a storage capacitor, and (d) a step of interconnecting the extension portion of the channel region to the light-shielding layer.

In accordance with this exemplary manufacturing method, the extension portion connected to the channel region of the transistor is formed to be connected to the electrically conductive light-shielding layer. The channel region is fixed to the potential of the light-shielding layer. This arrangement resolves the problem of the degradation of the source-drain withstand voltage of the transistor caused by the substrate floating effect attributed to a high carrier mobility of the monocrystal silicon and an SOI structure. An electro-optical device having stable electrical characteristics is thus manufactured.

In accordance with this exemplary manufacturing method, the (c) step preferably includes gluing a monocrystal silicon substrate onto the substrate, and forming the semiconductor layer of the monocrystal silicon layer by removing an unwanted portion from the glued monocrystal silicon substrate. Since this exemplary manufacturing method manufactures a high performance transistor fabricated of monocrystal silicon as a drive element for the electro-optical device, the image quality and reliability thereof are improved.

In accordance with this exemplary manufacturing method, the (d) step preferably includes connecting an interconnect line, which connects the extension portion to the light-shielding layer through a first contact hole formed in the extension portion and a second contact hole formed in the light-shielding layer, to the semiconductor layer through a third contact hole formed in the semiconductor layer. Since the interconnect line and the data line are concurrently fabricated of the same material in this manufacturing method, the interconnect line is produced without increasing manufacturing steps.

The (d) step preferably includes connecting an interconnect line, which connects the extension portion to the light-shielding layer through a first contact hole in the extension portion and a second contact hole that penetrates the extension portion in a region including the internal portion of the first contact hole and is formed in the light-shielding layer, to the semiconductor layer through a third contact hole formed in the semiconductor layer. This arrangement in which the second contact hole wholly or in part overlaps the region of the first contact hole results in a smaller layout area than in the arrangement in which the two contact holes are separately formed. The aperture ratio of the display area is thus enlarged, thereby resulting in a bright display.

In the exemplary manufacturing method of one exemplary embodiment of the present invention, the (d) step preferably includes fabricating, of the same layer as the one that forms the scanning line, an interconnect line which interconnects the extension portion to the light-shielding layer through a first contact hole formed in the extension portion and a second contact hole formed in the light-shielding layer. Since the interconnect line and the scanning line are concurrently fabricated of the same material in this manufacturing method, the interconnect line is produced without increasing manufacturing steps.

The (d) step preferably includes fabricating, of the same layer as the one that forms the scanning line, an interconnect line which connects the extension portion to the light-shielding layer through a first contact hole in the extension portion and a second contact hole that penetrates the extension portion in a region including the internal portion of the first contact hole and is formed in the light-shielding layer. This arrangement in which the second contact hole wholly or in part overlaps the region of the first contact hole results in a smaller layout area than in the arrangement in which the two contact holes are separately formed. The aperture ratio of the display area is thus enlarged, thereby resulting in a bright display.

The electro-optical device may include a counter substrate arranged to be opposed to the surface of the support substrate where the semiconductor layer is formed, and an electro-optical material interposed between the two substrates and driven by the transistor.

Electronic equipment of an exemplary embodiment of the present invention includes a light source, an electro-optical device for modulating light incoming from the light source in response to image information, and projection means for projecting the light modulated through the electro-optical device.

DETAILED DESCRIPTION OF PREFERRED EMBODIMENTS

Figure 1:
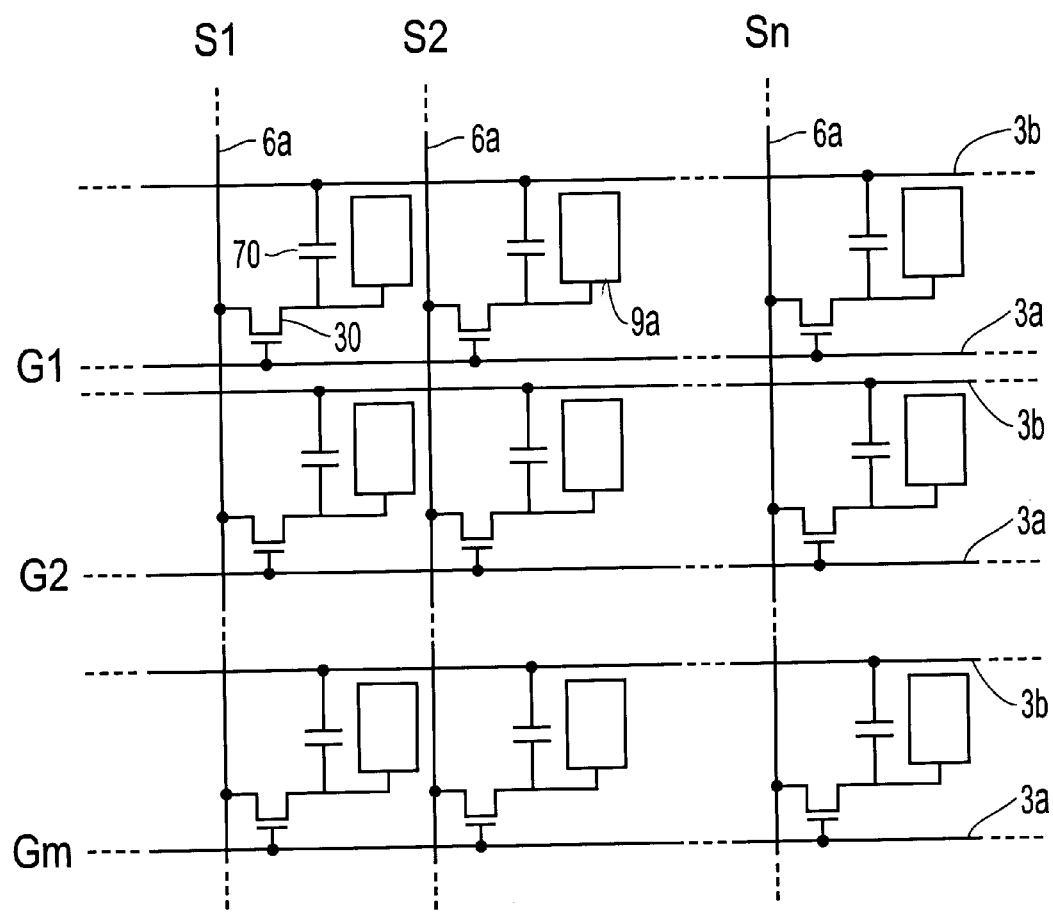
FIG. 1 is an exemplary circuit of a variety of elements and lines in a matrix of pixels forming an image display area in an exemplary liquid-crystal display device in a first exemplary embodiment of the present invention.

Referring to the drawings, the exemplary embodiments of the present invention are now discussed.

Figure 2:
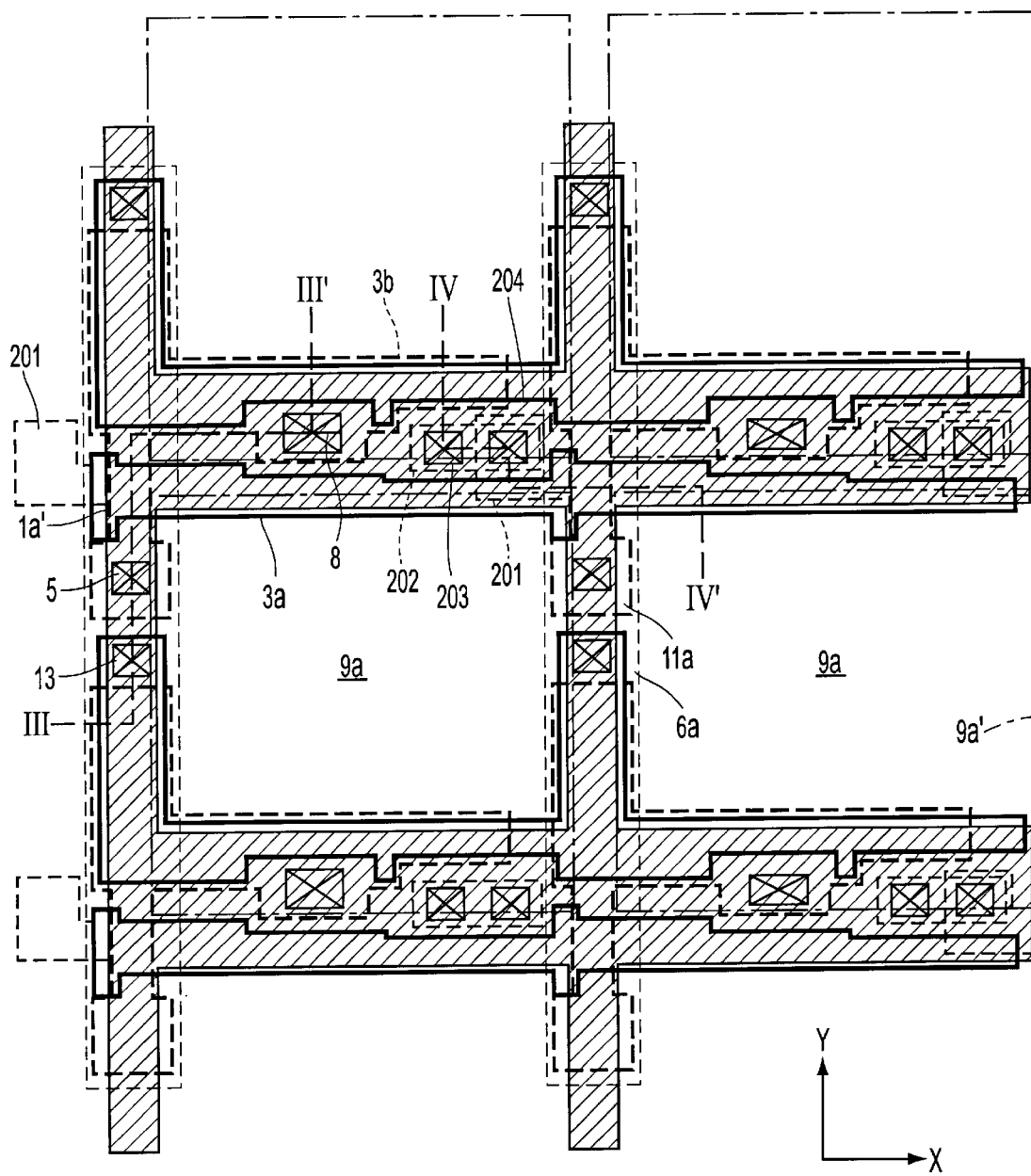
FIG. 2 is an exemplary plan view of a plurality of adjacent pixel groups in an exemplary TFT array substrate in which data lines, scanning lines, light-shielding layers, etc. are formed in the exemplary liquid-crystal display device.
Figure 3:
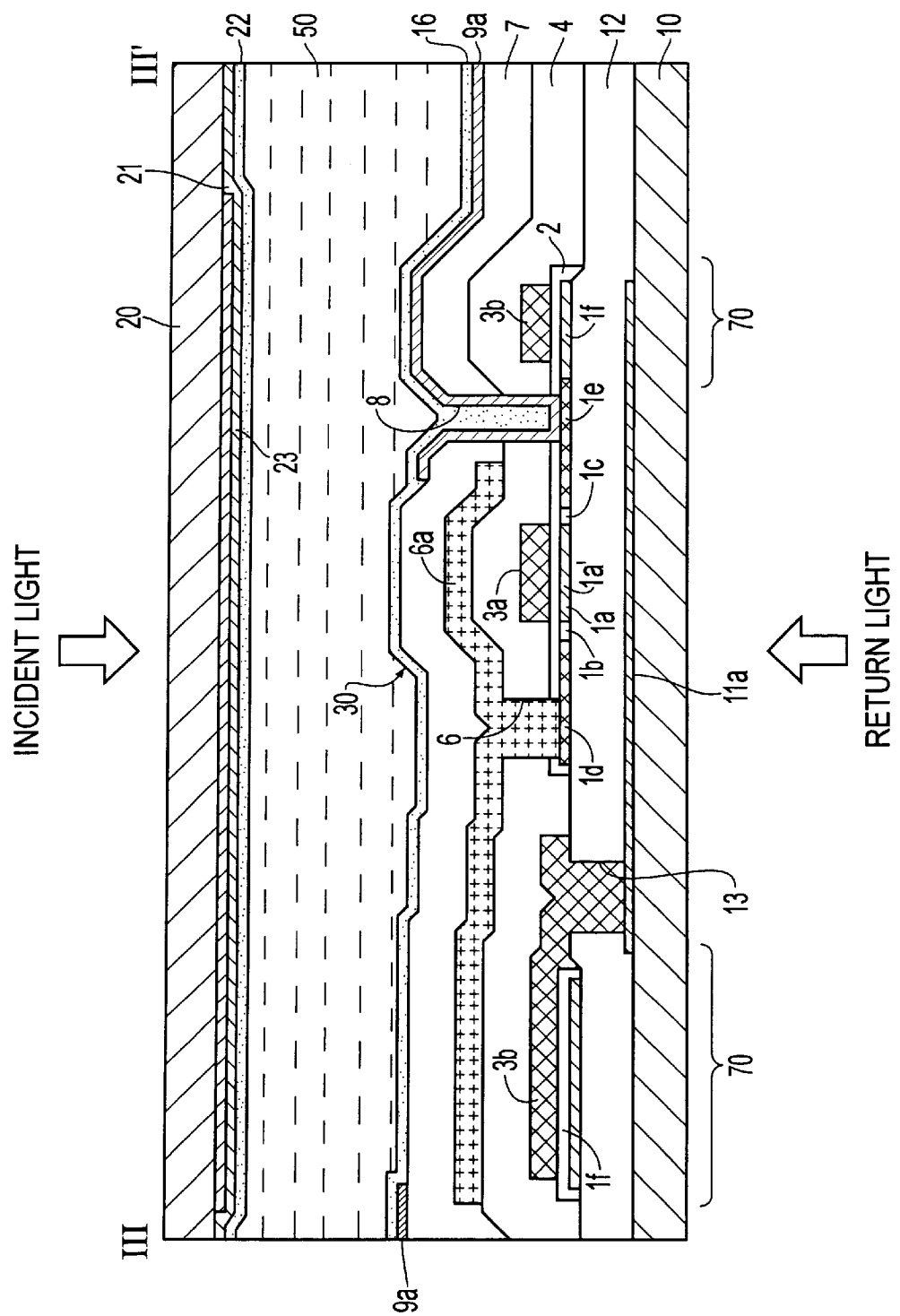
FIG. 3 is an exemplary cross-sectional view of the TFT array substrate taken along line III–III' in FIG. 2.
Figure 4:
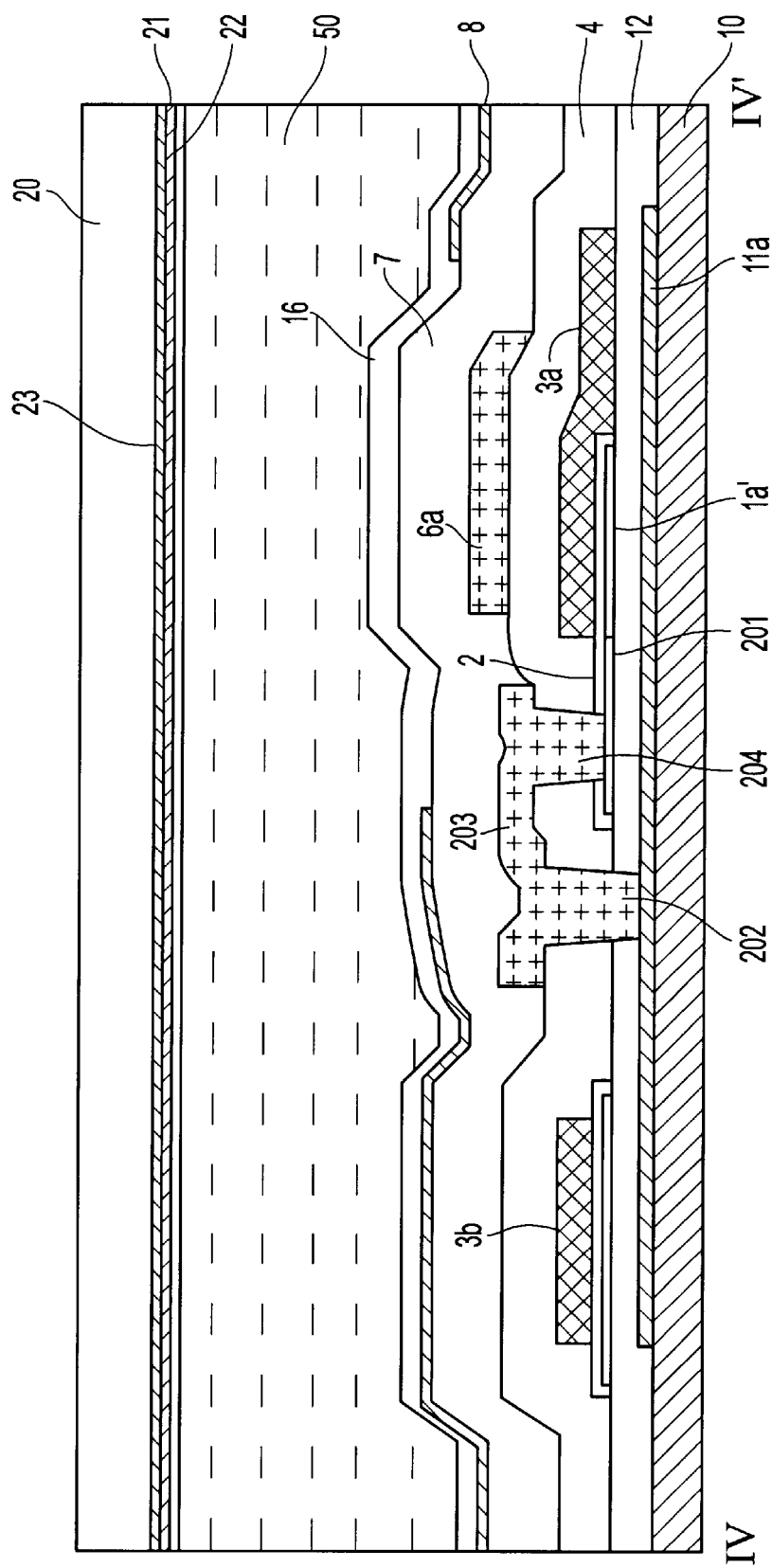
FIG. 4 is an exemplary cross-sectional view of the TFT array substrate taken along line IV–IV' in FIG. 2.
Figure 5:
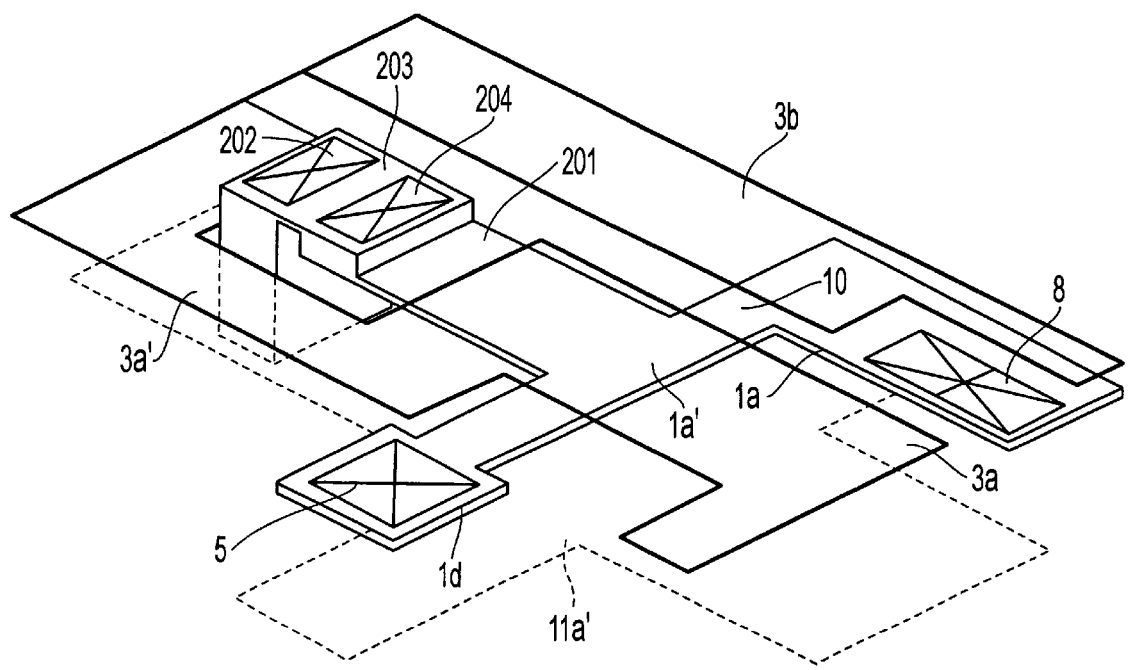
FIG. 5 is an exemplary perspective view conceptually showing an exemplary liquid-crystal display device including an exemplary semiconductor layer and its surrounding structure.
Figure 5:
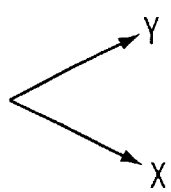

FIG. 1 is an exemplary circuit diagram showing elements and wirings in a matrix of pixels forming an image display area in a liquid-crystal display device as an electro-optical device in accordance with a first exemplary embodiment of the present invention. FIG. 2 is a plan view showing a plurality of pixels arranged side by side in a TFT array substrate that bears data lines, scanning lines, pixel electrodes, and light-shielding layers. FIG. 3 is a sectional view of the TFT array substrate taken along line III–III' in FIG. 2, and FIG. 4 is a sectional view of the TFT array substrate taken along line IV–IV'. FIG. 5 is a perspective view that conceptually shows a semiconductor layer and its peripheral structure in the exemplary liquid-crystal display device. Referring to FIG. 3, FIG. 4, and FIG. 5, layers and members are not necessarily consistently drawn to scale for easy identification. Referring to FIG. 2 and FIG. 5, the X direction refers to a direction parallel to the scanning line, and the Y direction refers to a direction parallel to the data line.

Referring to FIG. 1, the exemplary liquid-crystal display device of the first embodiment in the display area thereof includes a matrix of pixel electrodes respectively arranged at intersections of the scanning lines 3a and the data lines 6a. Each pixel is composed of a pixel electrode 9a, and a TFT 30 as a transistor for controlling the pixel electrode 9a. The TFT 30 is configured with the source thereof connected to the data line 6a, with the drain thereof connected to the pixel electrode 9a, and with the gate thereof connected to the scanning line 3a.

The scanning lines 3a are successively supplied with scanning signals G1, G2, . . . , Gm in the pulse form thereof in that order, and the data lines 6a are supplied with image signals S1, S2, . . . , Sn in that order, each having a voltage corresponding to a display content. A plurality of data lines 6a may be supplied with the image signal on a group by group basis.

When the scanning signal fed to one scanning line 3a is driven to an active level in this arrangement, the TFTs 30 connected to the scanning line 3a are turned on, thereby writing the image signals S1, S2, . . . , Sn supplied from the data lines 6a onto corresponding liquid crystals through pixel electrodes 9a.

The image signals S1, S2, . . . , Sn at predetermined levels written on the liquid crystals through the pixel electrodes 9a are stored with respect to a counter electrode (to be discussed later) formed in a counter substrate (to be discussed later) for a constant duration of time. The liquid crystal modulates light to present a gradation display by changing the orientation or order of a set of molecules with an applied voltage level. In the normally white mode, incident light is blocked by the liquid crystal in response to the applied voltage, while in the normally black mode, the liquid crystal allows light to pass therethrough. The exemplary liquid-crystal display device outputs light having a contrast responsive to the image signal. To prevent the stored image signal from being leaked, a storage capacitor 70 is added in parallel with a capacitor of the liquid crystal formed between the pixel electrode 9a and the counter electrode. The addition of the storage capacitor 70 further improves the storage characteristic of the pixel, thereby resulting in a high-contrast liquid-crystal display device. To incorporate the storage capacitor 70 in this embodiment, a low-resistance capacitive line 3b is formed of the same layer as that for the scanning line or by using the electrically conductive light-shielding layer, as will be discussed later.

Referring to FIG. 2, the TFT array substrate of the exemplary liquid-crystal display device includes a matrix of transparent pixel electrodes 9a (with the outlines thereof represented by one-dot dash chain lines 9a'). The data line 6a, and the scanning line 3a, and the capacitive line 3b run respectively vertically and horizontally along each pixel electrode 9a. The data line 6a is electrically connected to the source region, to be discussed later, of a semiconductor layer 1a of a monocrystal silicon layer through a contact hole 5, and the pixel electrode 9a is electrically connected to the drain region, to be discussed later, of the semiconductor layer 1a through a contact hole 8. The scanning line 3a, arranged to face the channel region (to be discussed later) of the semiconductor layer 1a, serves as a gate electrode of the transistor.

The capacitive line 3b includes a main line portion that generally linearly runs along the scanning line 3a (a first portion formed to run along the scanning line 3a in a plan view), and a projecting portion projecting toward a preceding stage (in an upward direction as shown) along the data line 6a (a second portion extending along the data line 6a in the plan view).

A first light-shielding layer 11a is formed in an area hatched by right upwardly inclined lines. Specifically, each of the first light-shielding layers 11a is arranged in a position for covering the TFT, from the TFT array substrate, including at least the channel region of the semiconductor layer 1a in the pixel matrix area. The first light-shielding layer 11a runs along the scanning line 3a in a manner such that the first light-shielding layer 11a faces the main line portion of the capacitive line 3b, and along the scanning line 3a and the data line 6a. The first light-shielding layer 11a is thus generally configured in a grating. Beneath the data line 6a, the first light-shielding layer 11a overlaps an upward projecting end of the capacitive line 3b. In the overlap area, a contact hole 13 for electrically connecting the first light-shielding layer 11a and the capacitive line 3b is arranged. In this embodiment, the first light-shielding layer 11a is electrically connected to the preceding or subsequent capacitive line 3b through the contact hole 13.

Referring to exemplary sectional view shown in FIG. 3, the exemplary liquid-crystal display device includes the transparent TFT array substrate 10 and a transparent counter substrate 20 opposed to the transparent TFT array substrate 10. The TFT array substrate 10 is fabricated of a quartz substrate, for instance, and the counter substrate 20 is fabricated of a glass substrate or a quartz substrate, for instance. The TFT array substrate 10 is provided with the pixel electrodes 9a, and arranged on top of them is an alignment layer 16 which has been subjected to a predetermined rubbing process. The pixel electrode 9a is fabricated of a transparent, electrically conductive film, such as an ITO (Indium Tin Oxide) film. The alignment layer 16 is fabricated of an organic thin film, such as a polyimide thin film.

The counter substrate 20 has a counter electrode (common electrode) 21 extending on the entire surface thereof, and an alignment layer 22 therebeneath that has been subjected to a predetermined rubbing process. The counter electrode 21 is fabricated of a transparent, electrically conductive film, such as an ITO film. The alignment layer 22 is fabricated of an organic thin film such as a polyimide thin film.

Arranged on the TFT array substrate 10 is a pixel switching TFT 30, adjacent to each pixel electrode 9a, for controlling the pixel electrode 9a as shown in FIG. 3.

Arranged on the counter substrate 20 is a second light-shielding layer 23, in an area other than the aperture area in each pixel as shown in FIG. 3. For this reason, no incident light enters the channel region 1a', and LDDs (Lightly Doped Drain) regions 1b and 1c of the semiconductor layer 1a of the pixel switching TFT 30, from the counter substrate 20. The second light-shielding layer 23 has the function of improving a contrast ratio, and preventing color mixing of color materials.

A liquid crystal is encapsulated in a gap surrounded by a sealing material (not shown) between the TFT array substrate 10 and the counter substrate 20 arranged with the pixel electrodes 9a facing the counter electrode 21. A liquid-crystal layer 50 is thus formed. The liquid-crystal layer 50 takes a predetermined orientation state by the alignment layer 16 and the alignment layer 22 with no electric field applied by the pixel electrode 9a. The liquid-crystal layer 50 is formed of a mixture of one or several types of nematic liquid crystals. The sealing material is an adhesive agent made of a thermal setting agent or a photo-setting agent for bonding the TFT array substrate 10 to the counter substrate 20 along the edges thereof, and is mixed with spacers such as glass fiber or glass beads to keep a predetermined distance between the two substrates.

Referring to FIG. 3, the first light-shielding layer 11a is arranged on the TFT array substrate 10 in a position corresponding to the pixel switching TFT 30. The first light-shielding layer 11a is preferably fabricated of a metal, a metal alloy or a metal silicide, including at least one selected from the group of opaque refractory metals consisting of Ti, Cr, W, Ta, Mo and Pd.

With the first light-shielding layer 11a fabricated of one of these materials, the first light-shielding layer 11a is not damaged or melted through a high-temperature thermal process for forming the pixel switching TFT 30, subsequent to the formation step of the first light-shielding layer 11a on the TFT array substrate 10. In this exemplary embodiment, the first light-shielding layer 11a is formed on the TFT array substrate 10, light returning from the TFT array substrate 10 is prevented from entering the channel region 1a' and LDD regions 1b and 1c of the pixel switching TFT 30, and the pixel switching TFT 30 as a transistor element is free from degradation in characteristics due to leakage photocurrent in response to incident light.

A first interlayer insulator (insulating layer) 12 is provided between the first light-shielding layer 11a and a plurality of pixel switching TFTs 30. The first interlayer insulator 12 is arranged to electrically isolate the semiconductor layer 1a of the pixel switching TFT 30 from the first light-shielding layer 11a. The first interlayer insulator 12 is formed on the entire surface of the TFT array substrate 10, and serves as a support substrate of the pixel switching TFT 30. Specifically, the first interlayer insulator 12 has the function of preventing the characteristics of the pixel switching TFT 30 from being degraded by surface irregularity of the TFT array substrate 10 caused during a polishing process or dirt left after a cleaning operation. The interlayer insulator 12 is fabricated of highly insulating glass such as NSG (non-doped silicate glass), PSG (phosphosilicate glass), BSG (borosilicate glass), BPSG (borophosphosilicate glass) or a silicon oxide film or a silicon nitride film. The use of the first interlayer insulator 12 prevents the first light-shielding layer 11a from contaminating the pixel switching TFT 30.

In this exemplary embodiment, the gate insulator 2 extends from a position facing the scanning line 3a and is used as a dielectric layer, the semiconductor layer 1a extends, forming a first storage capacitor electrode 1f, and a portion of the capacitive line 3b facing these becomes a second storage capacitor electrode. The storage capacitor 70 is thus formed. More specifically, a heavily doped drain region 1e of the semiconductor layer 1a extends beneath the data line 6a and the scanning line 3a, and faces the capacitive line 3b extending along the data line 6a and the scanning line 3a, with the insulating layer 2 interposed therebetween, thereby forming the first storage capacitor electrode (semiconductor layer) 1f. The insulating layer 2, as a dielectric material of the storage capacitor 70, is the gate insulator 2 of the TFT 30 that is formed in the monocrystalline silicon layer through a high-temperature thermal process. The insulating layer 2 is thus thin and has a high withstand voltage. The storage capacitor 70 offers a high-capacitance storage capacitor with a relatively small area thereof.

As a result, the space external to the aperture area, namely, an area beneath the data line 6a, and an area where a disclination takes place in the liquid crystal along the scanning line 3a (i.e., a formation area of the capacitive line 3b), is effectively used, increasing the storage capacitor of the pixel electrode 9a.

The first light-shielding layer 11a (and the capacitive line 3b electrically connected thereto) is electrically connected to a constant voltage power source. The first light-shielding layer 11a and the capacitive line 3b are thus maintained at a constant voltage. The voltage fed to the first light-shielding layer 11a and the capacitive line 3b is preferably not higher than the lowest voltage applied to the source or the drain of the transistor when the transistor formed over the light-shielding layer is of an N-channel type. Available as the constant voltage power source in this case may be a negative-voltage power source for the peripheral circuits for driving the exemplary liquid-crystal display device (such as the scanning-line drive circuit and the data-line drive circuit), or ground potential. The voltage fed to the first light-shielding layer 11a and the capacitive line 3b is preferably not lower than the highest voltage applied to the source or the drain of the transistor when the transistor formed over the light-shielding layer 11a is of a P-channel type. Available as the constant voltage power source in this case may be a positive-voltage power source for the peripheral circuits for driving the exemplary liquid-crystal display device (such as the scanning-line drive circuit and the data-line drive circuit).

Since electrons or holes generated in the channel with the transistor being driven flow to the light-shielding layer through the extension portion, the potential of the channel region is stabilized. This arrangement controls the substrate floating effect of the transistor, thereby preventing a drop in the withstand voltage of the transistor. With the power source for these peripheral circuits shared, the first light-shielding layer 11a and the capacitive line 3b are stabilized at a constant voltage without the need for the arrangement of dedicated wiring and external voltage input terminals. The pixel switching TFT 30, opposed to the first light-shielding layer 11a, is thus free from any adverse effect arising from variations in the voltage of the first light-shielding layer 11a. The capacitive line 3b excellently serves as the second storage capacitor electrode of the storage capacitor 70.

Referring to FIG. 2 and FIG. 3, the first light-shielding layer 11a is electrically connected to the capacitive line 3b at the preceding stage or subsequent stage through the contact hole 13. The step between the area where the capacitive line 3b and the first light-shielding layer 11a are formed to overlap the data line 6a along the edge of the aperture area within the pixel matrix area, and the remaining area is small, compared with the case in which the first light-shielding layer 11a is electrically connected to the capacitive line 3b of own stage.

If the step along the outline of the aperture area of the pixel matrix area is small, the disclination (orientation defect) of the liquid crystal arising from the step is also small, and the aperture of the pixel matrix area is thus expanded.

The contact hole 13 is drilled in the projecting portion of the first light-shielding layer 11a projecting from the main line portion thereof linearly extending as already discussed. It is known that as the contact hole 13 is arranged closer to the edge of the first light-shielding layer 11a, stress spreads more from the edge, possibly causing less cracking. Depending on how close the contact hole 13 is to the edge of the projection portion (preferably, depending on how close the contact hole 13 to the edge within the margin of the projecting portion), stress acting on the first light-shielding layer 11a in the course of the manufacturing process is alleviated. The cracking is thus effectively prevented, and production yield is heightened.

Referring to FIG. 2, FIG. 4, and FIG. 5, the channel region 1a' of the semiconductor layer 1a includes an extension portion 201 extending in the X direction (the Y direction is aligned in parallel with the source region, the channel region, and the drain region of the semiconductor layer 1a, and the X direction is aligned perpendicular to the Y direction on the plane of the TFT array substrate 10). The first extension portion 201 thus extends in a manner such that it faces the scanning line 3a. The end of the extension portion 201 is connected to an interconnect line 203 through a contact hole 204 formed in a second insulator layer 4. One end of the interconnect line 203 is connected to the extension portion 201 through the contact hole 204 as already discussed. The other end of the interconnect line 203 is connected to the first light-shielding layer 11a through a contact hole 202 formed next to the contact hole 204. In this way, the channel region 1a' of the semiconductor layer 1a is fixed to the constant voltage of the first light-shielding layer 11a that is connected to the constant voltage source. This arrangement eliminates the degradation of the source-drain withstand voltage attributed to the substrate floating effect of the SOI structure. The electrical characteristics of the transistor are thus stabilized.

The scanning line 3a and the capacitive line 3b are juxtaposed and extend between the first interlayer insulator 12 and the second interlayer insulator 4. The extension portion 201 further extends, facing the scanning line 3a. In this arrangement, however, the scanning line 3a would interfere with the contact hole 202 and the contact hole 204. In this embodiment, the scanning line 3a has a bypass path 3a' bypassing the contact hole 202 and the contact hole 204.

First, the capacitive line 3b and the scanning line 3a are constructed of the same polysilicon layer, second, the dielectric layer of the storage capacitor 70 and the gate insulator 2 of the TFT 30 are constructed of the same oxidized layer, third, the first storage capacitor electrode 1f, and the channel region 1a', the source region 1d, the drain region 1e, and the extension portion 201 of the TFT 30 are constructed of the same semiconductor layer 1a, and fourth, the data line 6a and the interconnect line 203 are constructed of the same metal layer. For this reason, the laminate structure formed on the TFT array substrate 10 is simplified. In the manufacturing method of the exemplary liquid-crystal display device, to be discussed later, the capacitive line 3b and the scanning line 3a are produced in the same thin film formation step, and the dielectric layer of the storage capacitor 70 and the gate insulator 2 are concurrently produced.

The linear main line portion of the first light-shielding layer 11a generally overlaps the linear main line portion of the capacitive line 3b as shown in FIG. 2. As long as the first light-shielding layer 11a is arranged in a position covering the channel region of the TFT 30 and overlaps at any point the capacitive line 3b so that the contact hole 13 may be formed, the function of light-shielding the TFT and the function of providing a low-resistance to the capacitive line are carried out. The first light-shielding layer 11a may be extended to cover an elongated spacing between the scanning line 3a and the capacitive line 3b running therealong, and further to partly overlap the scanning line 3a.

The contact hole 13 drilled in the first interlayer insulator 12 assures a secure and reliable electrical connection between the capacitive line 3b and the first light-shielding layer 11a. Such a contact hole 13 may be drilled on a per pixel basis, or may be drilled for every group of pixels.

When the contact hole 13 is drilled on a per pixel basis, the first light-shielding layer 11a imparts low resistance to the capacitive line 3b, and a redundant structure is assured between the first light-shielding layer 11a and the capacitive line 3b. Drilling the contact hole 13 for every group composed of a plurality of pixels (for instance, for every two pixels or for three pixels) is practically very advantageous, because benefits from the low resistance and redundant structure of the capacitive line 3b by the use of the first light-shielding layer 11a are adequately balanced with the complexity of the manufacturing process required to drill a number of contact holes 13, and the possibility of failures of the exemplary liquid-crystal display device attributed to the contact holes 13, while taking into account the sheet resistance, drive frequency of the capacitive line 3b, the first light-shielding layer 11a, and required specifications.

The contact holes 13, arranged on a per pixel basis or a per pixel group basis, are drilled below the data line 6a, if viewed from the counter substrate 20. The contact hole 13 is thus out of the aperture area within the pixel matrix area, and is arranged in the first interlayer insulator 12 in an area where neither TFT 30 nor first storage capacitor electrode 1f is formed. This arrangement prevents the formation of the contact hole 13 from damaging the TFT 30 and other lines while the pixel matrix area is effectively used.

Referring back to FIG. 3, the pixel switching TFT 30 has an LDD (Lightly Doped Drain) structure, and includes the scanning line 3a, the channel region 1a' of the semiconductor layer 1a in which a channel is formed by the electric field from the scanning line 3a, the thin insulating layer 2 for insulating the scanning line 3a from the semiconductor layer 1a, the data line 6a, the lightly doped source region (source LDD region) 1b and the lightly doped drain region (drain LDD region) 1c of the semiconductor layer 1a, and the heavily doped source region 1d and the heavily doped drain region 1e of the semiconductor layer 1a.

A corresponding one of the plurality of the pixel electrodes 9a is connected to the heavily doped drain region 1e. As will be discussed later, the source regions 1b and 1d and the drain regions 1c and 1e are doped with an N-type dopant or a P-type dopant having a predetermined concentration, depending on which type to dope the channel thereof, P-type or N-type, with respect to the semiconductor layer 1a. An N-channel TFT is advantageous for its high speed, and is frequently used as the pixel switching TFT 30 as a switching element for the pixel.

The data line 6a is fabricated of a light-shielding film such as of a metal film of Al, or an alloy film of metal-silicide. Formed on the scanning line 3a, the gate insulator 2, and the first interlayer insulator 12 is a second interlayer insulator 4 through which a contact hole 5 connecting to the heavily doped source region 1d and a contact hole 8 connecting to the heavily doped drain region 1e are formed. The data line 6a is electrically connected to the heavily doped source region 1d through the contact hole 5 to the source region 1b. Formed on the data line 6a and the second interlayer insulator 4 is a third interlayer insulator 7 through which a contact hole 8 connecting to the heavily doped drain region 1e is formed. The pixel electrode 9a is thus electrically connected to the heavily doped drain region 1e through the contact hole 8 to the heavily doped drain region 1e. The previously described pixel electrode 9a is formed on top of the third interlayer insulator 7 thus constructed. The pixel electrode 9a may be electrically connected to the heavily doped drain region 1e via an Al film, from which the data line 6a is produced, or via the polysilicon film, from which the capacitive line 3b is constructed.

The pixel switching TFT 30 preferably has the above-referenced LDD structure, but may have an offset structure in which no impurity ion implantation is performed on the lightly doped source region 1b and the lightly doped drain region 1c, or may have a self-aligned type TFT in which a high dose impurity ion is implanted with the gate electrode 3a being used as a mask, to form heavily doped source and drain in a self-alignment process.

The gate electrode (scanning line 3a) of the pixel switching TFT 30 is of a single gate structure in which a single gate is interposed between the source and drain regions 1b and 1e, but alternatively, more than one gate electrode may be interposed therebetween. In this case, the gate electrodes are supplied with the same polarity signal. With dual gates or triple gates employed in a TFT, leakage currents in junctions between the channel region and the source region and between the channel region and the drain region are prevented, and thereby a current during the off period is reduced. If at least one of the gate electrodes is arranged in an LDD structure or an offset structure, an off current is reduced, resulting in a stable switching element.

When light is incident on the monocrystalline silicon layer forming the channel region 1a', the lightly doped source region 1b, and the lightly doped drain region 1c of the semiconductor layer 1a, a photocurrent is generated through a photoelectric conversion process of the silicon, thereby degrading the transistor characteristics of the pixel switching TFT 30. In this exemplary embodiment, the data line 6a for covering the scanning line 3a from above is fabricated of a metal film having a light-shielding property, such as of Al, light is effectively prevented from entering at least the channel region 1a', and LDD regions 1b and 1c of the semiconductor layer 1a. Since the first light-shielding layer 11a is arranged beneath the pixel switching TFT 30 as already discussed, returning light is effectively prevented from entering at least the channel region 1a', and the LDD regions 1b and 1c of the semiconductor layer 1a.

Since the first light-shielding layer 11a is connected to the capacitive line 3b at the preceding stage or the subsequent stage adjacent thereto in this embodiment, the pixels of the top row or the bottom row need the capacitive line 3b for supplying the first light-shielding layer 11a with a fixed voltage.

The number of the capacitive lines 3b is thus set to be larger than the number of pixels in a vertical direction by one.

Exemplary Manufacturing Method of the Electro-Optical Device

An exemplary manufacturing process of the exemplary liquid-crystal display device thus constructed is discussed, referring to FIG. 6(A) through FIG. 11(C), and FIG. 17(A) through FIG. 22(C). FIG. 6(A) through FIG. 11(C) show exemplary process steps for the TFT array substrate, in the same way as it is shown in FIG. 3 which is an exemplary cross-sectional view taken along line III–III' in FIG. 2. FIG. 17(A) through FIG. 22(C) show exemplary process steps for the TFT array substrate, in the same way as it is shown in FIG. 3 which is an exemplary cross-sectional view taken along line IV–IV' in FIG. 2.

Figure 6A:
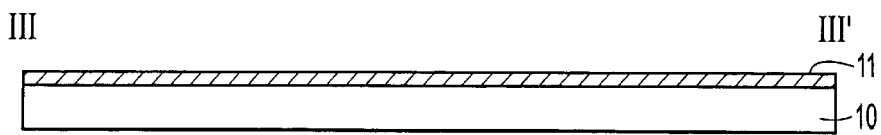
FIGS. 6(A)–6(H) are exemplary cross-sectional views taken along line III–III' in FIG. 2, successively showing an exemplary manufacturing process of the exemplary liquid-crystal display device.
Figure 17A:
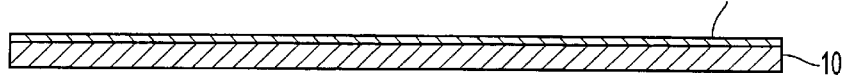
FIGS. 17(A)–17(H) are exemplary cross-sectional views taken along line IV–IV' in FIG. 2, successively showing an exemplary manufacturing process of the exemplary liquid-crystal display device in accordance with the first embodiment.

Referring to a step shown in FIG. 6(A) and a step shown in FIG. 17(A), the TFT array substrate 10, such as a quartz substrate or a hard glass substrate, is prepared. The TFT array substrate 10 is annealed in an inert gas atmosphere such as N$_2$ (nitrogen) gas within a temperature range of 900 to 1300° C. so that the TFT array substrate 10 suffers less distortion in a subsequent high-temperature thermal process. In other words, the TFT array substrate 10 is subjected beforehand to a heat treatment as high as or higher than the maximum temperature expected in the high-temperature thermal process in the manufacturing process.

Through the sputtering technique, a metal layer of Ti, Cr, W, Ta, Mo or Pd, or an alloy layer of metal silicide is deposited on the entire surface of the TFT array substrate 10 thus processed, and the light-shielding layer 11 is thus formed to a thickness within a range of 200 to 400 nm, preferably to a thickness of approximately 200 nm.

Figure 6B:
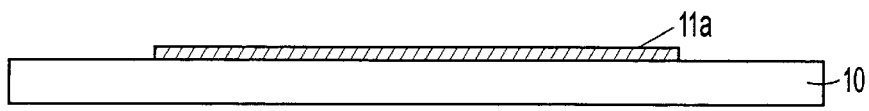
Figure 17B:
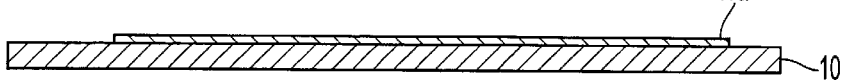

Referring to a step shown in FIG. 6(B) and a step shown in FIG. 17(B), a resist mask for the pattern of the first light-shielding layer 11a (see FIG. 2) is formed on the light-shielding layer 11 through the photolithographic technique. By etching the light-shielding layer 11 through the resist mask, the first light-shielding layer 11a is formed.

Figure 6C:
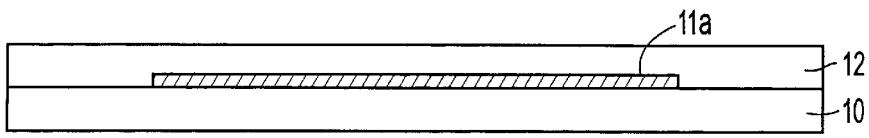
Figure 17C:
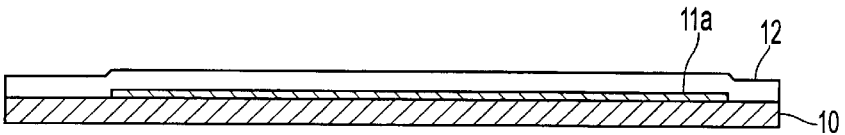

Referring to a step shown in FIG. 6(C) or a step shown in FIG. 17(C), formed on the first light-shielding layer 11a is the first interlayer insulator 12 fabricated of a silicate glass film such as NSG, PSG, BSG, or BPSG, a silicon nitride film, or a silicon oxide film, using TEOS (tetraethylorthosilicate) gas, TEB (triethyl borate) gas, or TMOP (trimethyl phosphate) gas or the like through an atmospheric CVD method or a reduced pressure CVD method. The thickness of the first interlayer insulator 12 falls within a range from 600 to 1000 nm, and preferably is approximately 800 nm.

Figure 6D:
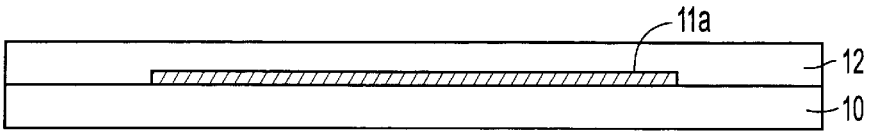
Figure 17D:
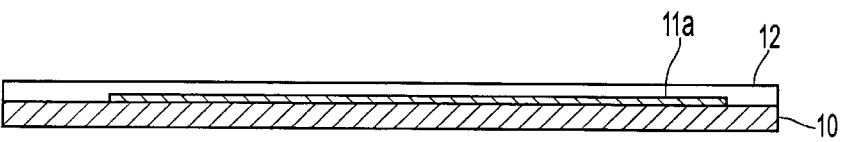

Referring to a step shown in FIG. 6(D) and a step shown in FIG. 17(D), the surface of the first interlayer insulator 12 is globally polished for planarization. For instance, the CMP (chemical mechanical polish) process may be employed as a means for planarization through polishing.

Figure 6E:
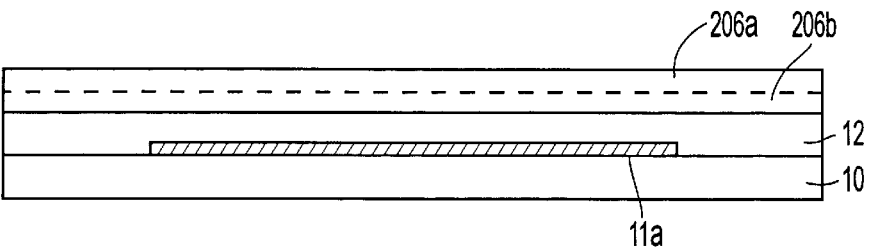
Figure 17E:
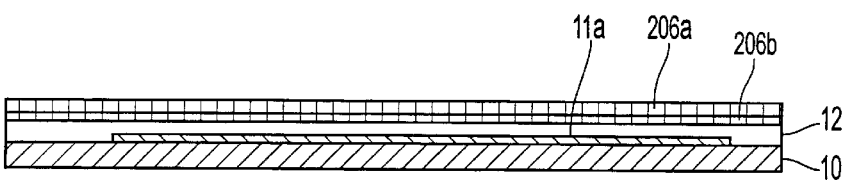

Referring to a step shown in FIG. 6(E) and a step shown in FIG. 17(E), the monocrystalline silicon substrate 206a is bonded to the substrate 10. The monocrystalline silicon substrate 206a to be bonded has a thickness of 600 mm. The monocrystalline silicon substrate 206a is oxidized beforehand to a depth of 0.05 to 0.8 mm on the surface thereof to form the oxide layer 206b, and is implanted with a dose of 10e$^{16}$/cm$^2$ of hydrogen ions (H$^+$) at an acceleration voltage of 100 keV. The bonding process uses a method of directly bonding the two substrates in a thermal process of two hours at a temperature of 300° C.

Figure 6F:
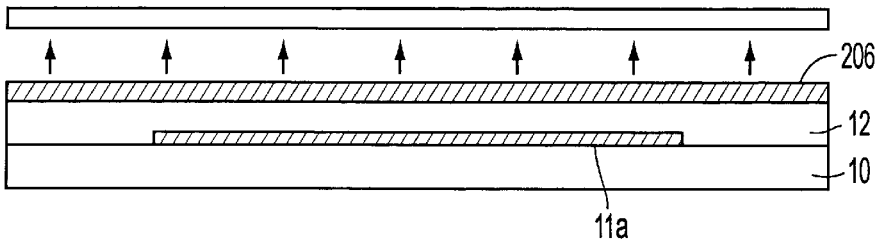
Figure 17F:
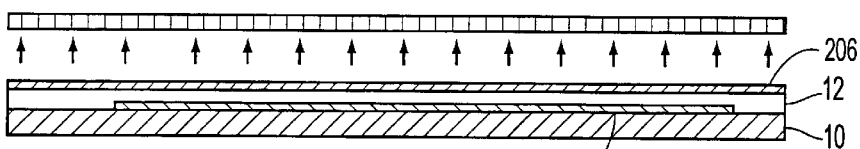

Referring to a step shown in FIG. 6(F) and a step shown in FIG. 17(F), a thermal process is performed to peel the monocrystalline silicon substrate 206a off the substrate 10 with the oxide layer 206b, at the bonding side of the monocrystalline silicon substrate 206a, and the monocrystalline silicon layer 206 left. The peel process takes place because the hydrogen ions introduced into the monocrystalline silicon layer break the bond of silicon at a layer close to the surface of the monocrystalline silicon layer. The peel process is performed by subjecting the two bonded substrates to a thermal process to a temperature of 600° C. of a temperature ramp rate of 20° C./m. Through this thermal process, the monocrystalline silicon substrate 206a is peeled off the substrate 10, and a monocrystalline silicon layer 206 having a thickness of 200 nm +/−5 nm remains on the substrate 10. The thickness of the monocrystalline silicon layer 206 bonded to the substrate 10 is varied by changing the acceleration voltage for the hydrogen ion implantation to the above-referenced monocrystalline silicon substrate 206a.

Figure 6G:
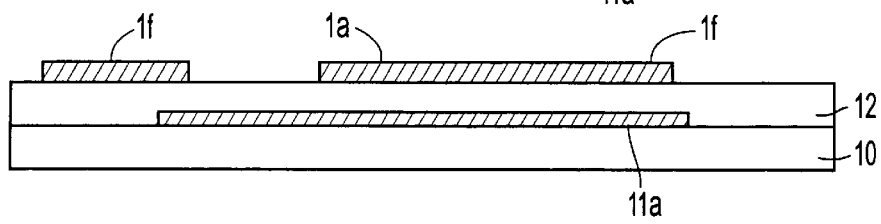
Figure 17G:
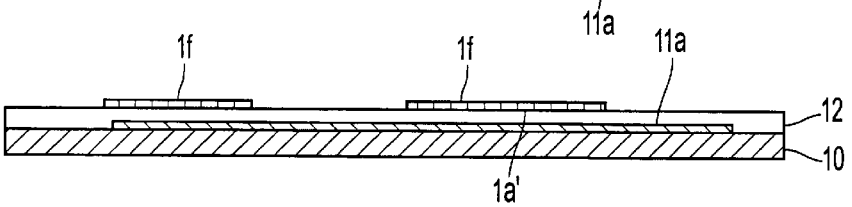

Referring to a step shown in FIG. 6(G) and a step shown in FIG. 17(G), the semiconductor layer 1a having the pattern shown in FIG. 2 is formed through photolithographic process, etching process, etc. The first storage capacitor electrode 1f, which extends from the semiconductor layer 1a of the pixel switching TFT 30, is formed in an area where the capacitive line 3b is formed beneath the data line 6a and in an area where the capacitive line 3b is formed along the scanning line 3a. The extension portion 201 extending from the channel region 1a' of the semiconductor layer 1a is produced at the same time.

Figure 6H:
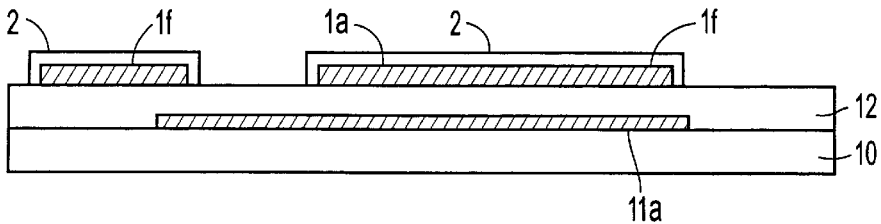
Figure 17H:
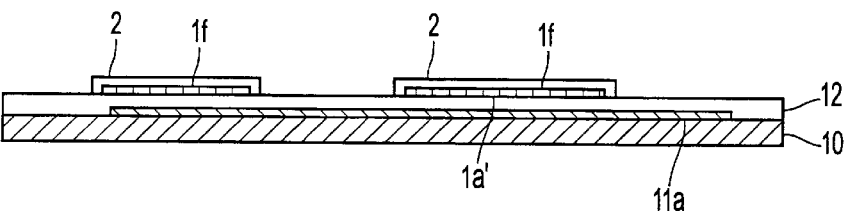

Referring to a step shown in FIG. 6(H) and a step shown in FIG. 17(H), the first storage capacitor electrode 1f along with the semiconductor layer 1a forming the pixel switching TFT 30 is thermally oxidized for 72 minutes at a temperature within a range from 850 to 1300° C., preferably at a temperature of approximately 1000° C., and a thermally oxidized silicon layer as thin as approximately 60 nm is produced. The gate insulator 2 for capacitance is thus formed along with the gate insulator 2 of the pixel switching TFT 30. The thickness of the semiconductor layer 1a and the first storage capacitor electrode 1f is approximately 170 nm, and the thickness of the gate insulator layer 2 is approximately 60 nm.

Figure 7A:
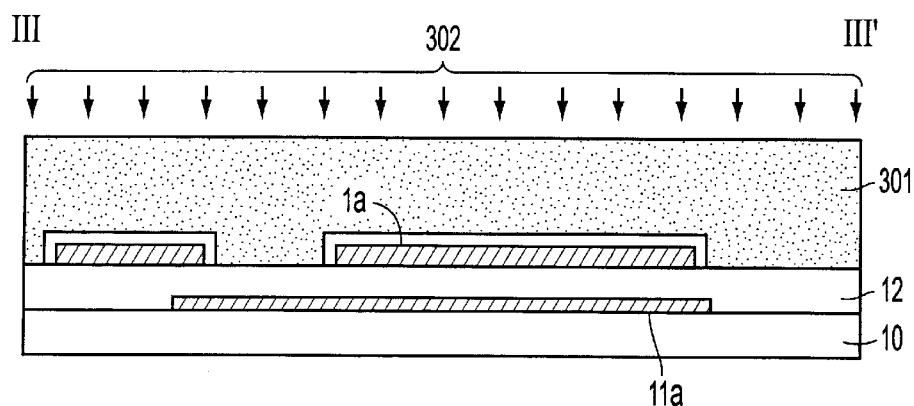
FIGS. 7(A)–7(D) are cross-sectional views taken along line III–III' in FIG. 2, successively showing an exemplary manufacturing process of the exemplary liquid-crystal display device.
Figure 18A:
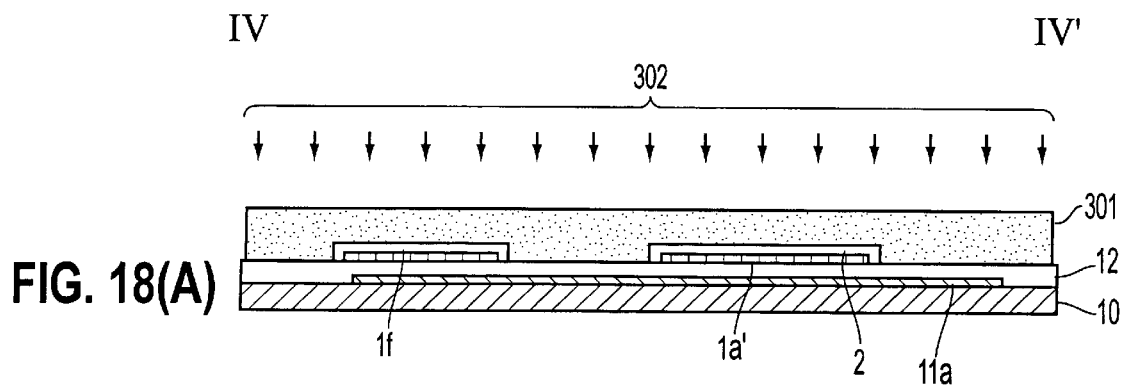
FIGS. 18(A)–18(D) are exemplary cross-sectional views taken along line IV–IV' in FIG. 2, successively showing an exemplary manufacturing process of the exemplary liquid-crystal display device.

Referring to a step shown in FIG. 7(A) and a step shown in FIG. 18(A), a resist film 301 is formed in an area corresponding to the N-channel semiconductor layer 1a, while the P-channel semiconductor layer 1a is lightly doped with a group V dopant 302 such as P (for instance, at a dose of $2e^{11}/cm^2$ of P ions at an acceleration voltage of 70 keV).

Figure 7B:
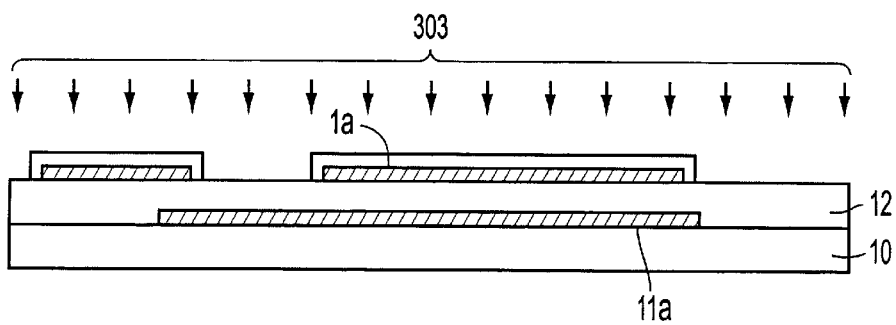
Figure 18B:
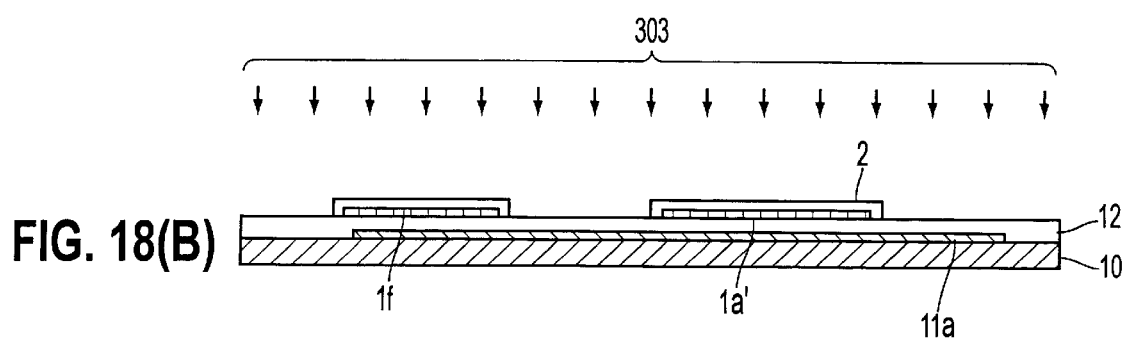

Referring to a step shown in FIG. 7(B) and a step shown in FIG. 18(B), a resist film is formed in an area corresponding to the P-channel semiconductor layer 1a (not shown), while the N-channel semiconductor layer 1a is doped with a group III dopant 303 such as B (for instance, at a dose of $1e^{12}/cm^2$ of B ions at an acceleration voltage of 35 keV).

Figure 7C:
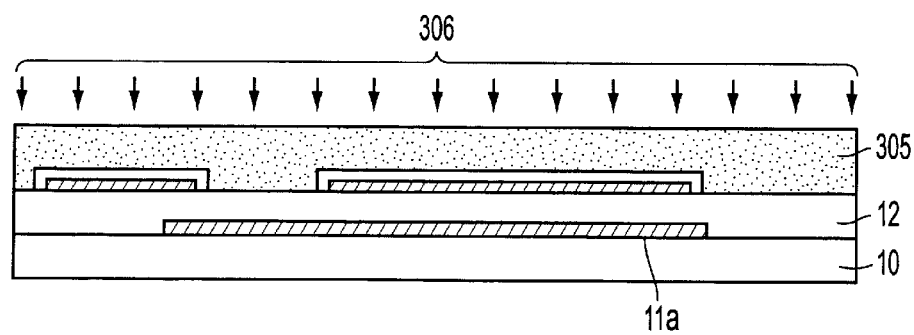
Figure 12:
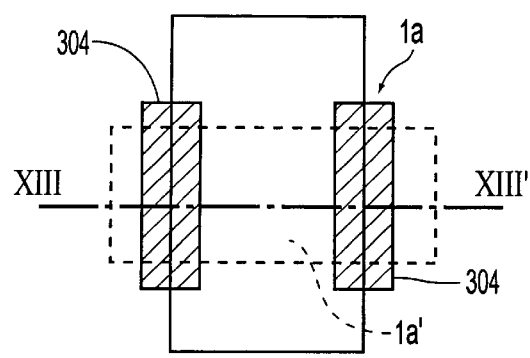
FIG. 12 is an exemplary partial plan view showing the structure of a channel region of the semiconductor layer in the exemplary liquid-crystal display device.
Figure 18C:
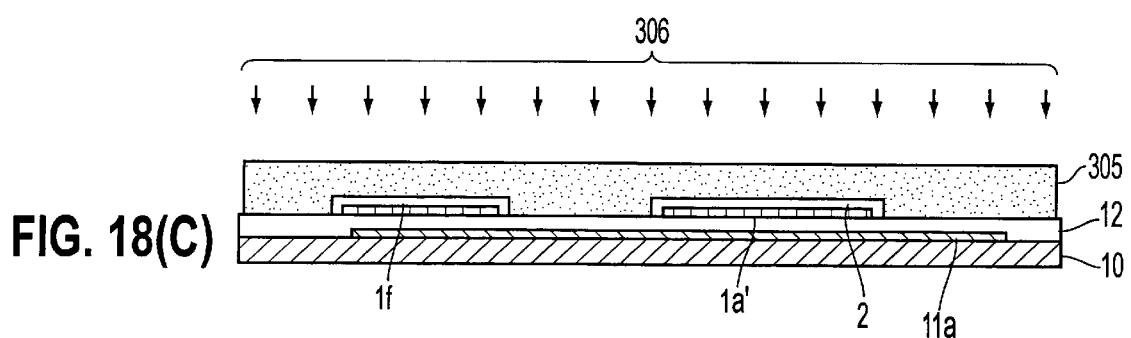

Referring to a step shown in FIG. 7(C) and a step shown in FIG. 18(C), a resist film 305 is formed on the surface of the substrate 10, other than an end portion 304 (see FIG. 12 and FIG. 13) of the channel region 1a' of the semiconductor layer 1a of each of the P-channel and N-channel. At the end portion 304, the P-channel is doped with a group V dopant 306 such as P, at a dose one to ten times stronger than the dose used in the steps shown in FIG. 7(A) and FIG. 18(A), and the N-channel is doped with a group III dopant 306 such as B at a dose one to ten times stronger than the dose used in the steps shown in FIG. 7(B) and FIG. 18(B). The electric field typically concentrates at the end portion 304 of the channel region 1a' of the semiconductor layer 1a, thereby lowering an apparent threshold voltage. This might cause a leakage current to flow. However, since the above steps result in an impurity density higher in the end portion 304 of the channel region 1a' of the semiconductor layer 1a than in the remaining portion, the apparent threshold voltage in the end portion 304 becomes higher, thereby preventing leakage current from flowing even under the concentrated electric field.

Figure 7D:
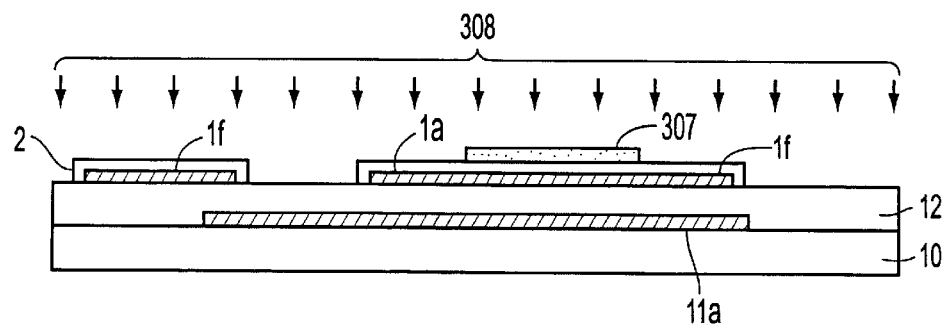
Figure 18D:
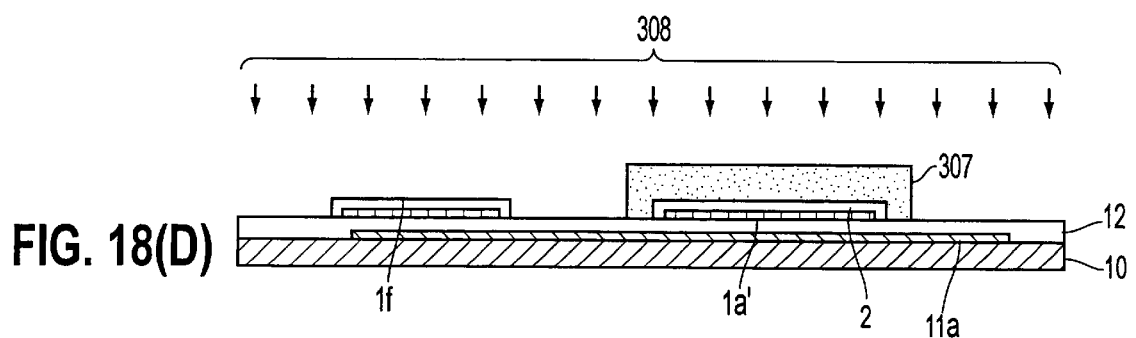

Referring to a step shown in FIG. 7(D) and a step shown in FIG. 18(D), to impart low resistance to the first storage capacitor electrode 1f that is formed by extending the semiconductor layer 1a, a resist film 307 (wider than the scanning line 3a) is formed in an area corresponding to the scanning line 3a (gate electrode) on the surface of the substrate 10, and the substrate 10 is then lightly doped with a group V dopant 308 such as P with the resist film 307 used as a mask (for instance, at a dose of $3e^{14}/cm^2$ of P ions at an acceleration voltage of 70 keV).

Figure 8A:
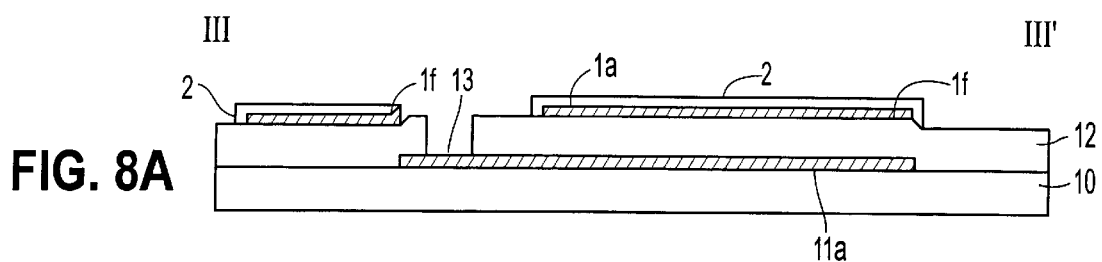
FIGS. 8(A)–8(E) are cross-sectional views taken along line III–III' in FIG. 2, successively showing an exemplary manufacturing process of the exemplary liquid-crystal display device.
Figure 19A:
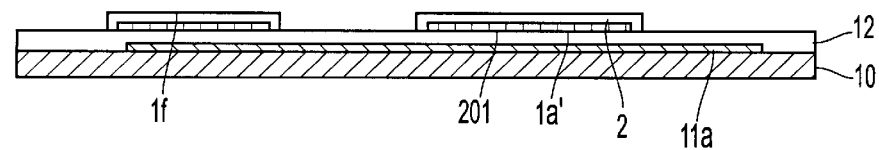
FIGS. 19(A)–19(E) are exemplary cross-sectional views taken along line IV–IV' in FIG. 2, successively showing an exemplary manufacturing process of the exemplary liquid-crystal display device.

Referring to a step shown in FIG. 8(A) and a step shown in FIG. 19(A), the contact hole 13 leading to the first light-shielding layer 11a is drilled in the first interlayer insulator 12 through a dry etching process such as a reactive etching or a reactive ion beam etching, or a wet etching process. In this case, the contact hole 13 is preferably formed through anisotropic etching such as reactive etching or reactive ion beam etching, because the hole can be drilled in a shape approximately identical to that of the mask. With the dry etching and the wet etching used in combination, the contact hole 13 is tapered, and an open circuit is thus prevented during a wiring process.

Figure 8B:
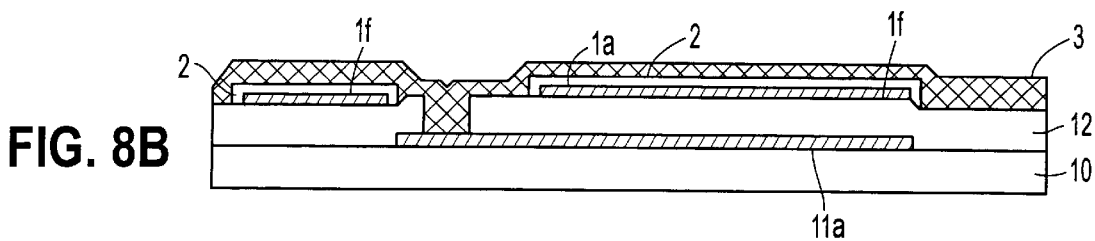
Figure 19B:
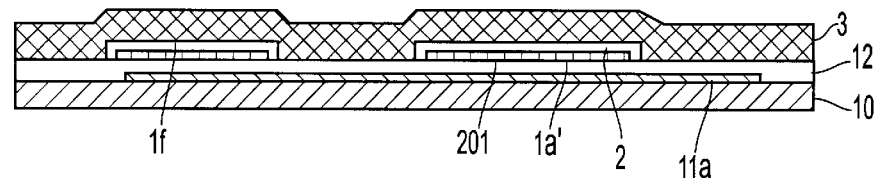

Referring to a step shown in FIG. 8(B) and a step shown in FIG. 19(B), the polysilicon layer 3 is deposited to a thickness within a range from 350 to 550 nm through the reduced pressure CVD method, and thermally diffused with phosphorus (P). The polysilicon layer 3 thus becomes electrically conductive. It is also acceptable to use a doped polysilicon layer which is doped with P ions during formation of the polysilicon layer 3. In this way, the electrical conductivity of the polysilicon layer 3 is enhanced. With the thickness of the gate electrode region of the scanning line more than 350 nm, wiring resistance is reduced, and a reduction, due to a delay along wiring, in signal write speed to write a signal to the pixel is sufficiently controlled. With the thickness of the gate electrode region of the scanning line less than 550 nm, the step of the element substrate attributed to the thickness of the gate electrode is controlled to the minimum possible height. As a result, disclination with the liquid crystal alignment is controlled, and the image quality is maintained. In addition to the polysilicon layer 3, an electrically conductive metal layer may be added, thereby heightening electrical conductivity.

Figure 8C:
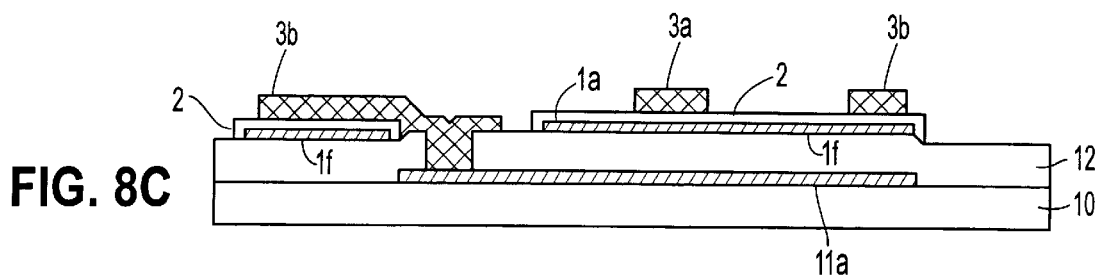
Figure 19C:
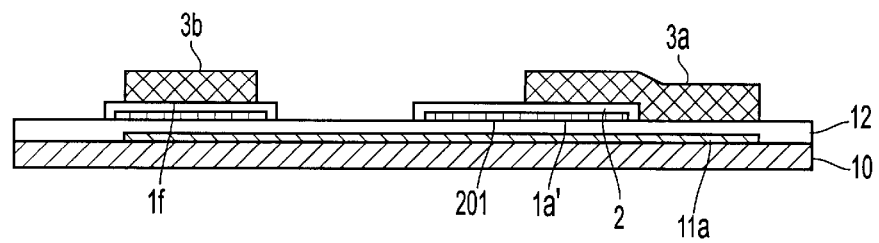

Referring to a step shown in FIG. 8(C) and a step shown in FIG. 19(C), the capacitive line 3b is formed along with the scanning line 3a having the pattern shown in FIG. 2 through a photolithographic process, an etching process, etc., using a resist mask. Polysilicon left on the back side of the substrate 10 is removed through etching with the front side of the substrate 10 covered with a resist film.

Figure 8D:
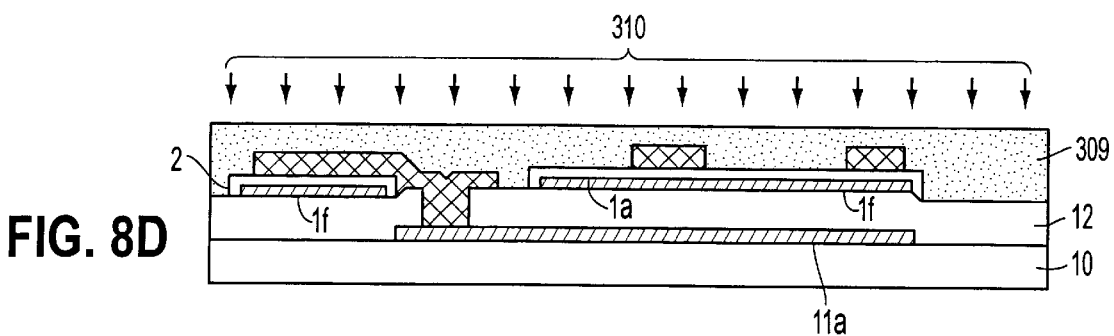
Figure 19D:
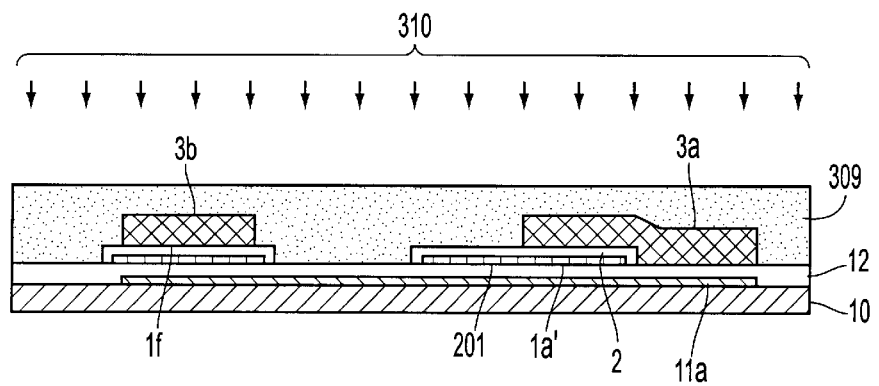

Referring to a step shown in FIG. 8(D) and a step shown in FIG. 19(D), an area corresponding to the N-channel semiconductor layer 1a is covered with a resist film 309 (the N-channel semiconductor layer 1a is shown in FIG. 8(D) and FIG. 19(D)) to form a P-channel LDD region in the semiconductor layer 1a, and is lightly doped with a group III dopant 310 such as B with the scanning line (gate electrode) 3a used as a diffusion mask (for instance, at a dose of $3e^{13}/cm^2$ of $BF_2$ ions at an acceleration voltage of 90 keV). The P-channel lightly doped source region 1b and lightly doped drain region 1c are thus formed.

Figure 8E:
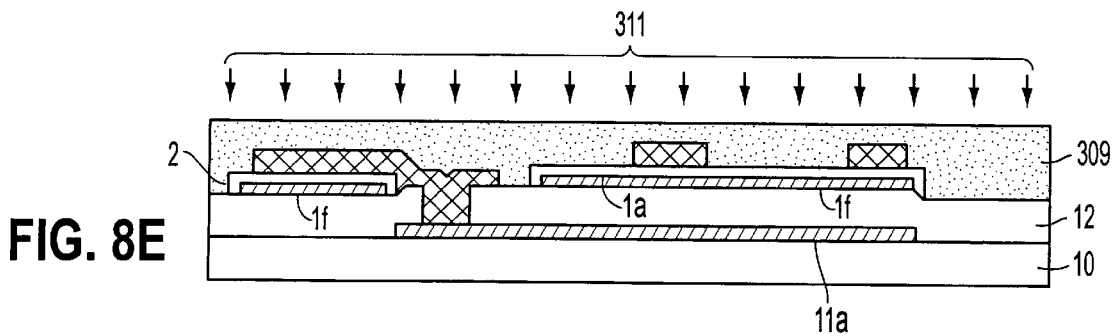
Figure 19E:
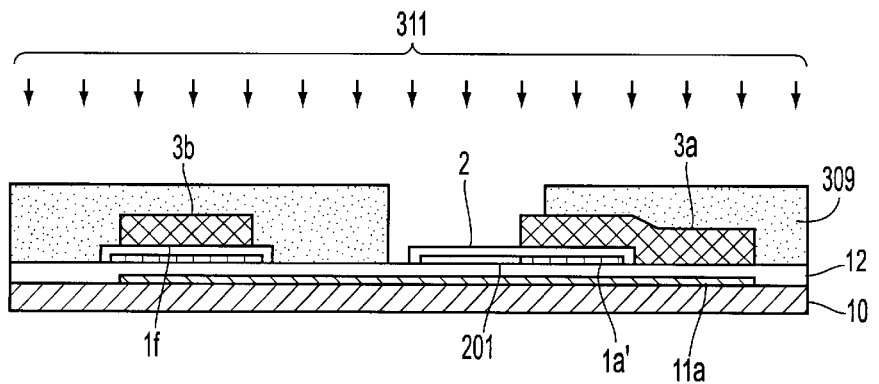

Referring to a step shown in FIG. 8(E) and a step shown in FIG. 19(E), the P-channel heavily doped source region 1d and P-channel heavily doped drain region 1e are formed in the semiconductor layer 1a. With the area corresponding to the N-channel semiconductor layer 1a covered with the resist film 309 and with a resist film (not shown) as a mask wider in width than the scanning line 3a formed on the scanning line 3a corresponding to the P-channel, the substrate 10 is heavily doped with a group III dopant 311 such as B (for instance, at a dose of $2e^{15}/cm^2$ of $BF_2$ ions at an acceleration voltage of 90 keV).

Figure 9A:
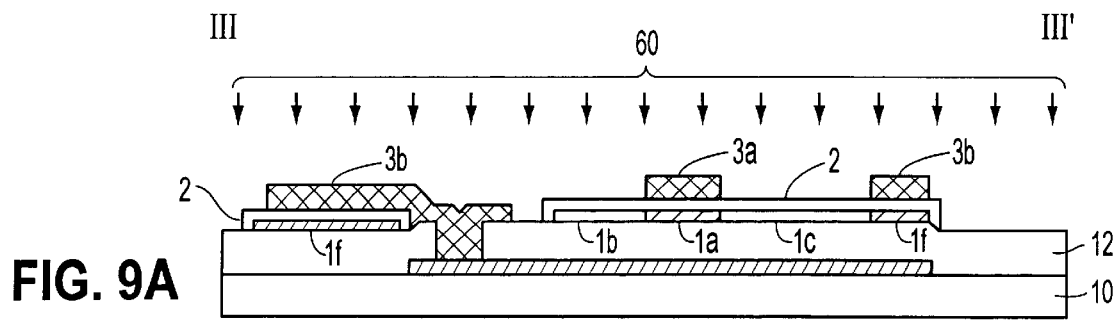
FIGS. 9(A)–9(D) are cross-sectional views taken along line III–III' in FIG. 2, successively showing an exemplary manufacturing process of the exemplary liquid-crystal display device.
Figure 20A:
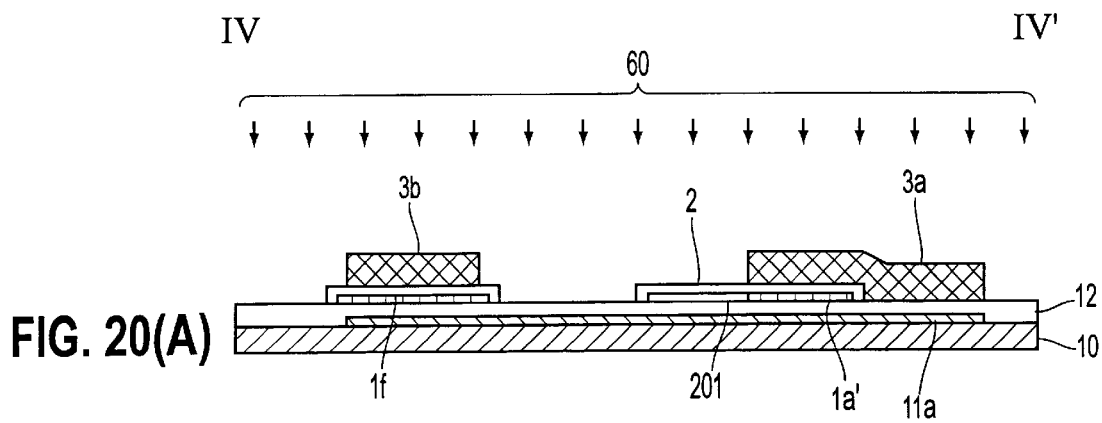
FIGS. 20(A)–20(D) are exemplary cross-sectional views taken along line IV–IV' in FIG. 2, successively showing an exemplary manufacturing process of the exemplary liquid-crystal display device.

Referring to a step shown in FIG. 9(A) and a step shown in FIG. 20(A), the N-channel LDD regions are formed in the semiconductor layer 1a. The substrate 10 is lightly doped with a group V dopant 60 such as P with an area corresponding to the P-channel semiconductor layer 1a covered with a resist film (not shown) and with the scanning line 3a (gate electrode) used as a diffusion mask (for instance, at a dose of $6e^{12}/cm^2$ of P ions at an acceleration voltage of 70 keV). The N-channel lightly doped source region 1b and lightly doped drain region 1c are thus formed.

Figure 9B:
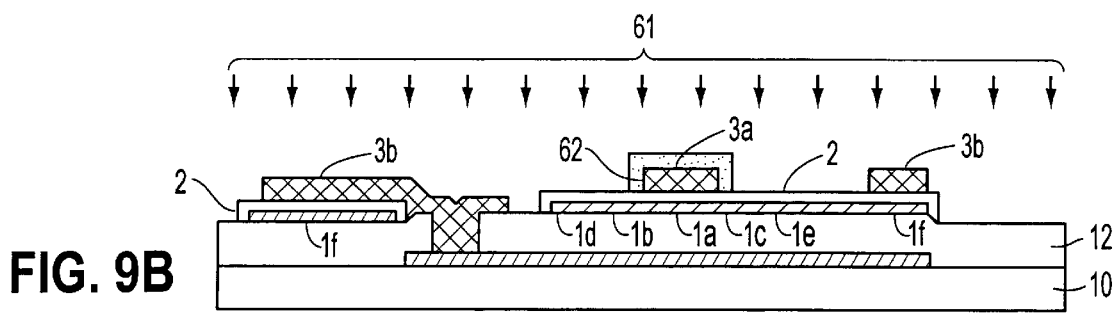
Figure 20B:
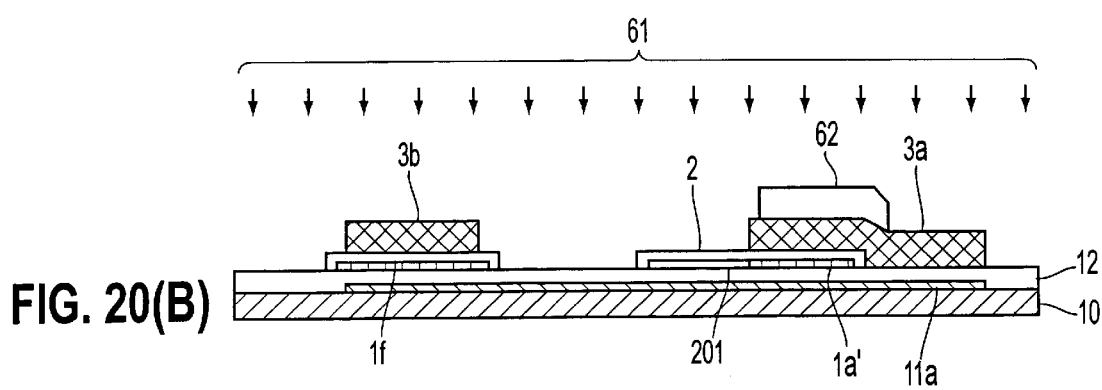

Referring to a step shown in FIG. 9(B) and a step shown in FIG. 20(B), the N-channel heavily doped source region 1d and heavily doped drain region 1e are formed in the semiconductor layer 1a. After a resist film 62 having a width wider than that of the scanning line 3a is formed on the scanning line 3a in an area corresponding to the N-channel, the substrate 10 is heavily doped with a group V dopant 61 such as P (for instance, at a dose of $4e^{15}/cm^2$ of P ions at an acceleration voltage 70 keV).

Figure 9C:
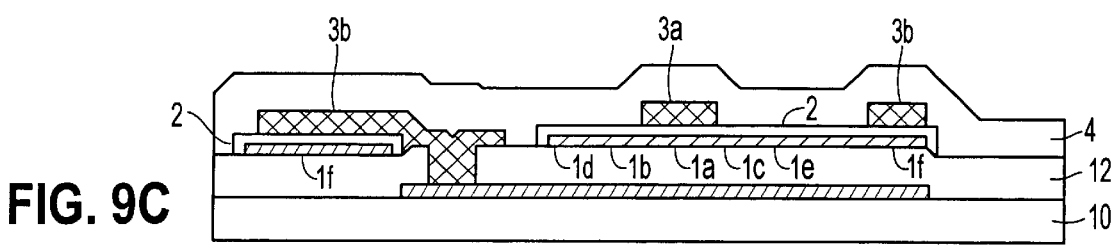
Figure 20C:
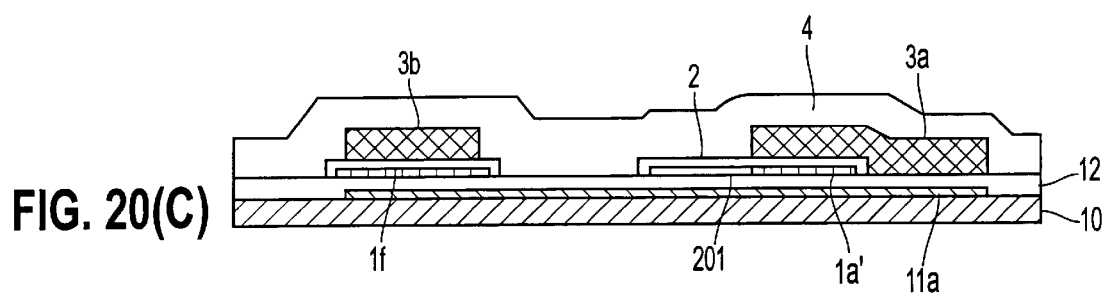

Referring to a step shown in FIG. 9(C) and a step shown in FIG. 20(C), the second interlayer insulator 4, fabricated of a silicate glass film such as NSG, PSG, BSG, or BPSG, a silicon nitride film, or a silicon oxide film, is formed using TEOS gas or the like through an atmospheric CVD method or a reduced pressure CVD method. The second interlayer insulator 4 thus covers the scanning line 3a in the pixel switching TFT 30 together with the capacitive line 3b and the scanning line 3a. The thickness of the second interlayer insulator 4 falls within a range from 600 to 1500 nm, and preferably is approximately 800 nm.

An annealing process is performed at about 85° C. for 20 minutes to activate the heavily doped source region 1d and the heavily doped drain region 1e.

Figure 9D:
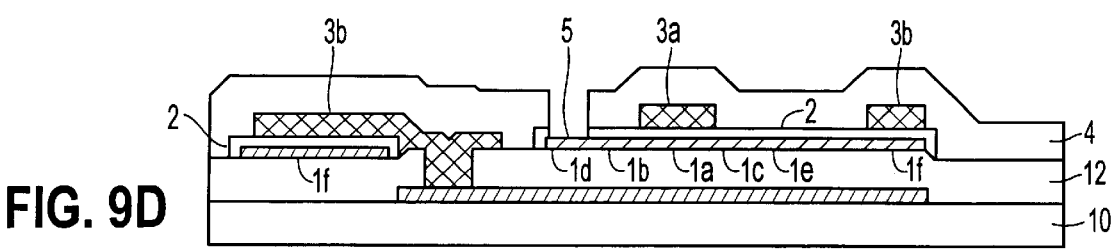
Figure 20D:
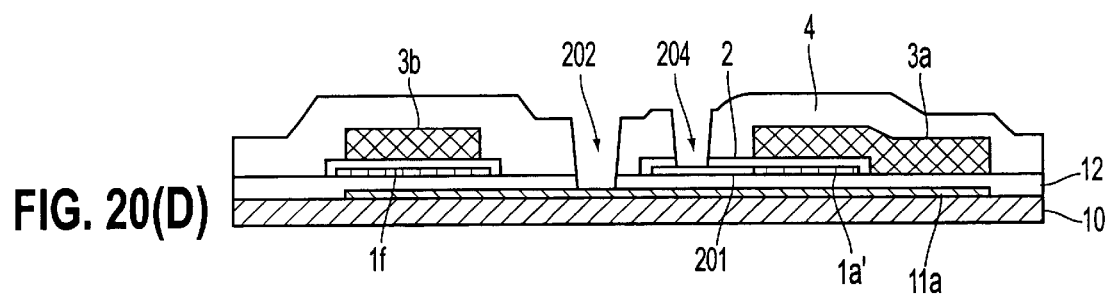

Referring to a step shown in FIG. 9(D) and a step shown in FIG. 20(D), the contact hole 5 (see FIG. 4 and FIG. 5) leading to the data line 6a and the control holes 204 and 202 for connecting the extension portion 201 to the first light-shielding layer 11a are formed through a dry etching process such as a reactive etching or a reactive ion beam etching, or a wet etching process. When the contact holes 204 and 204 are substantially different in depth as shown in FIG. 20(D), an etching step having a higher etch rate to the interlayer insulator may be performed or a photolithographic process may be separately performed for the contact hole 202 and for the contact hole 204. Contact holes for connecting the scanning line 3a and the capacitive line 3b to unshown wirings are drilled in the second interlayer insulator 4 at the same step as that for the contact hole 5.

Figure 10A:
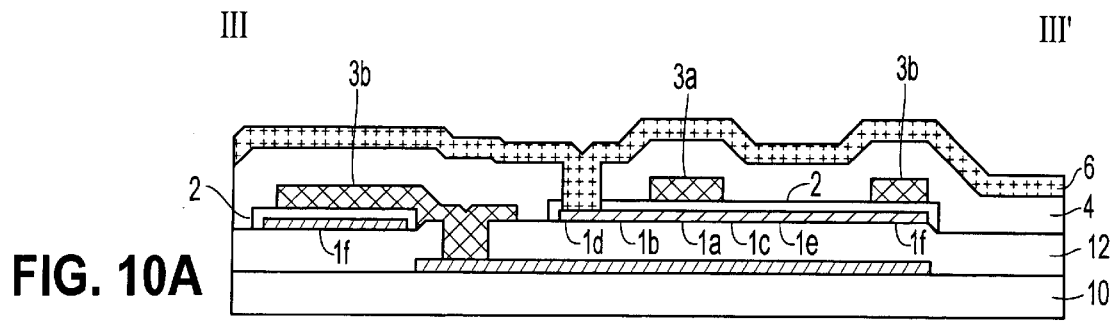
FIGS. 10(A)–10(C) are cross-sectional views taken along line III–III' in FIG. 2, successively showing an exemplary manufacturing process of the exemplary liquid-crystal display device.
Figure 10B:
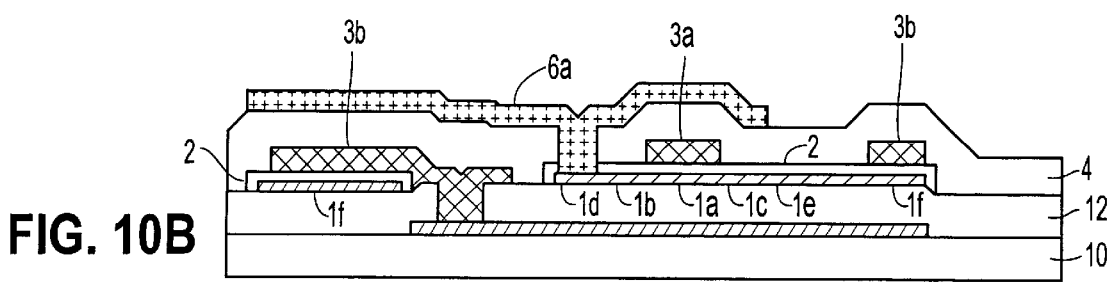
Figure 21A:
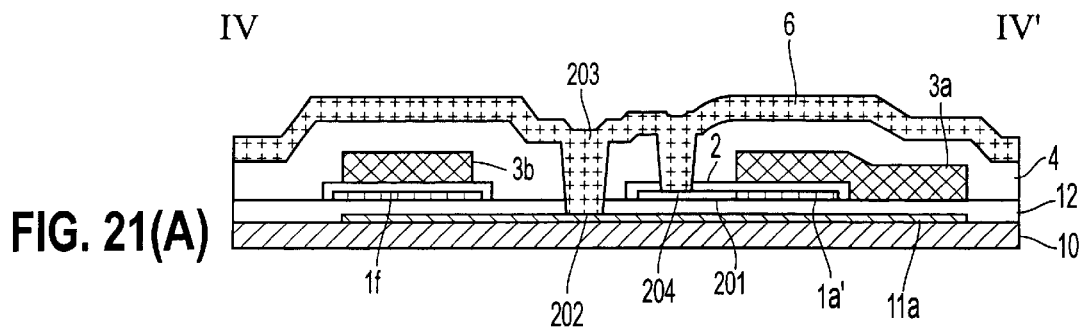
FIGS. 21(A)–21(C) are exemplary cross-sectional views taken along line IV–IV' in FIG. 2, successively showing an exemplary manufacturing process of the exemplary liquid-crystal display device.
Figure 21B:
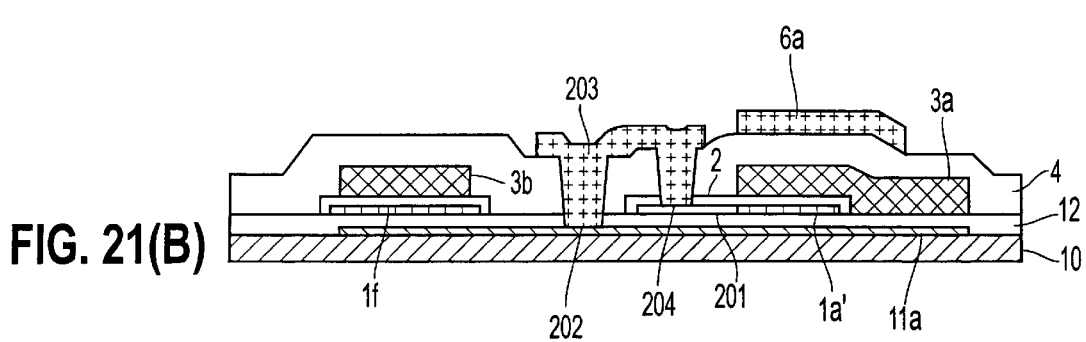

Referring to a step shown in FIG. 10(A) and a step shown in FIG. 21(A), a metal layer 6, fabricated of a low-resistance metal having a light-shielding property such as Al, or metal silicide, is formed on the second interlayer insulator 4 to a thickness within a range from 100 to 700 nm, preferably to a thickness of about 350 nm, through a sputtering process. Referring to a step shown in FIG. 1 0(B) and a step shown in FIG. 21(B), the data line 6a is formed through the photolithographic process, the etching process, etc. The interconnect line 203 is formed of the metal layer 6 (see FIG. 4 and FIG. 5) at the same time.

Figure 10C:
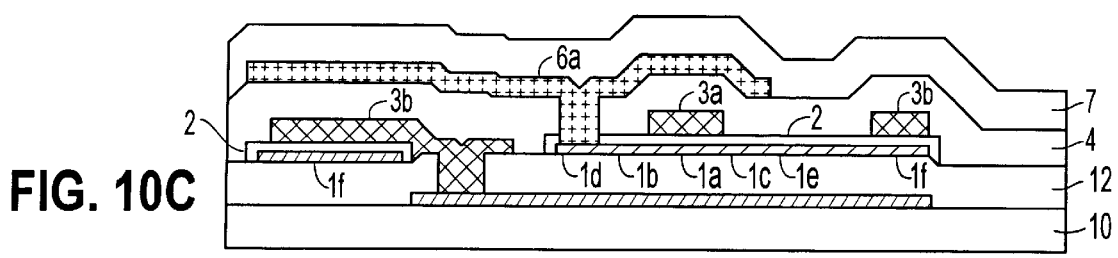
Figure 21C:
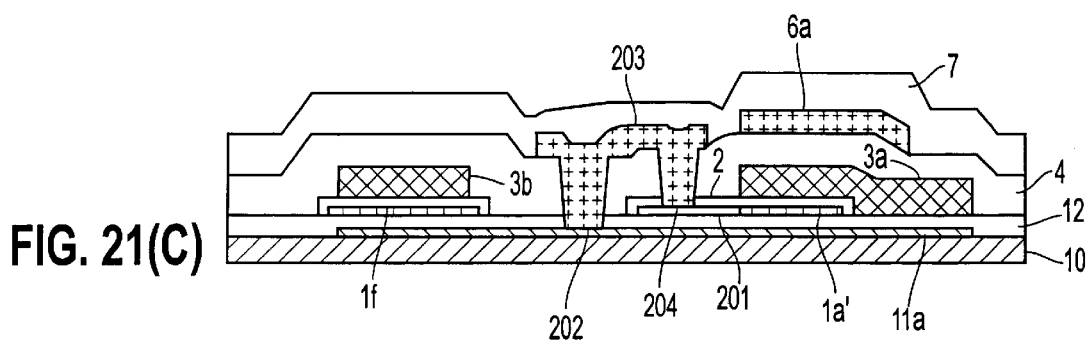

Referring to a step shown in FIG. 10(C) and a step shown in FIG. 21(C), using TEOS gas through an atmospheric CVD method or a reduced pressure CVD method, the third interlayer insulator 7, fabricated of a silicate glass film such as NSG, PSG, BSG, or BPSG, a silicon nitride film, or a silicon oxide film, is formed to cover the data line 6a. The thickness of the third interlayer insulator 7 falls within a range from 600 to 1500 nm, and preferably is approximately 800 nm.

Figure 11A:
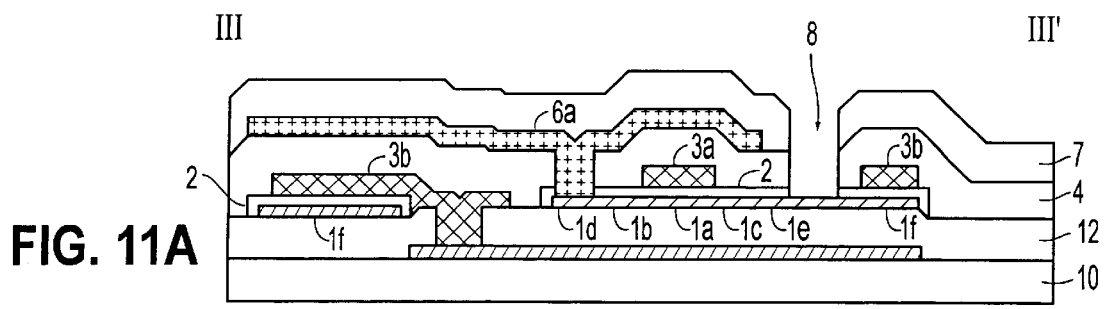
FIGS. 11(A)–11(C) are cross-sectional views taken along line III–III' in FIG. 2, successively showing an exemplary manufacturing process of the exemplary liquid-crystal display device.
Figure 22A:
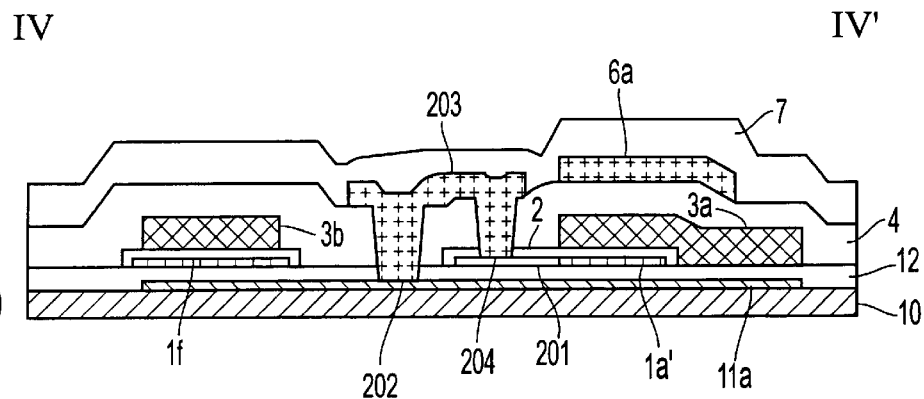
FIGS. 22(A)–22(C) are exemplary cross-sectional views taken along line IV–IV' in FIG. 2, successively showing an exemplary manufacturing process of the exemplary liquid-crystal display device.

Referring to a step shown in FIG. 11(A) and a step shown in FIG. 22(A), the contact hole 8 for electrically connecting the pixel electrode 9a to the heavily doped drain region 1e in the pixel switching TFT 30 is formed through a dry etching process such as a reactive etching or a reactive ion beam etching.

Figure 11B:
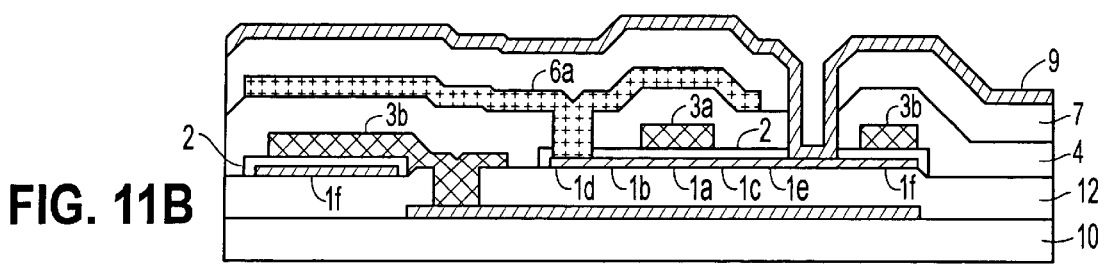
Figure 11C:
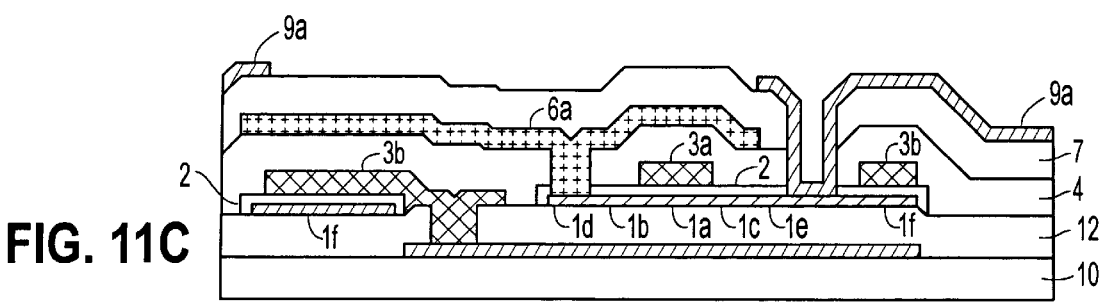
Figure 22B:
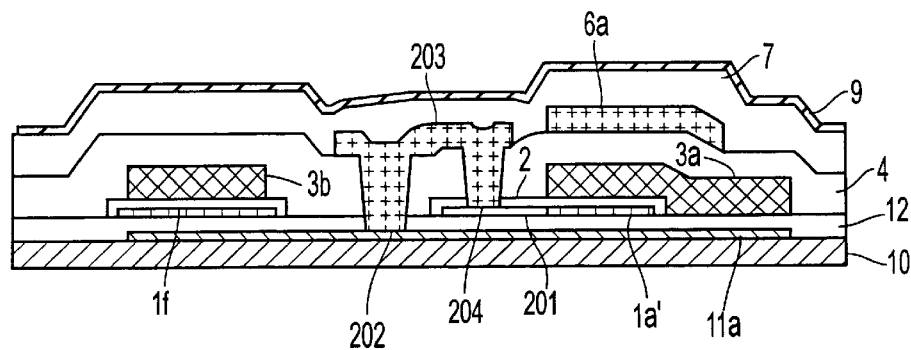
Figure 22C:
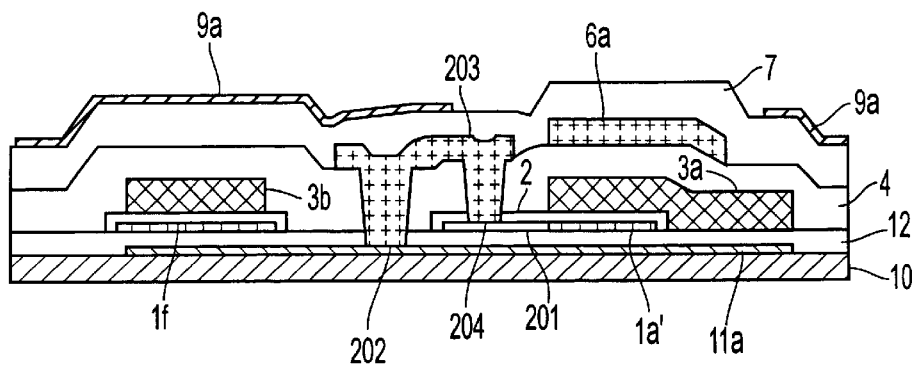

Referring to a step shown in FIG. 11(B) and a step shown in FIG. 22(B), the transparent, electrically conductive layer 9 such as an ITO layer is formed on the third interlayer insulator 7 to a thickness within a range of 50 to 200 nm through sputtering process. Referring to a step shown in FIG. 11(C) and a step shown in FIG. 22(C), the pixel electrode 9a is formed through the photolithographic process, the etching process, etc. When the exemplary liquid-crystal display device is of a reflective type, the pixel electrode 9a may be fabricated of an opaque material, such as Al, having a high reflectivity.

After a polyimide-based coating liquid for an alignment layer is applied onto the pixel electrode 9a, a rubbing process is performed in a predetermined direction at a predetermined pretilt angle. The alignment layer 16 thus results (see FIG. 3 and FIG. 4).

For the exemplary counter substrate 20 shown in FIG. 3 and FIG. 4, a glass substrate is first prepared. The second light-shielding layer 23 and a second light-shielding layer as a display peripheral outline, to be discussed later, are formed by sputtering of chromium, and then by photolithographic process, etching process, etc. The second light-shielding layer may be fabricated of a metal such as Cr, Ni, Al, or may be resin black in which carbon or Ti is dispersed in a photoresist.

A transparent, electrically conductive layer, such as an ITO layer is deposited on the entire surface of the counter substrate 20 to a thickness within a range of 50 to 200 nm. The counter electrode 21 thus results. After a polyimide-based coating liquid of alignment layer is applied on the entire surface of the counter electrode 21, the alignment layer is subjected to a rubbing process in a predetermined direction for a predetermined pretilt angle. The alignment layer 22 thus results (see FIG. 3).

The TFT array substrate 10 thus constructed and the counter substrate 20, each having its own layers formed thereon, are attached to each other using a sealing material 52 with the alignment layer 16 facing the alignment layer 22. Through vacuum absorption, a mixture of a plurality of nematic liquid crystals is drawn into the gap between the two substrates. The liquid-crystal layer 50 having a predetermined thickness is thus obtained.

Figure 23:
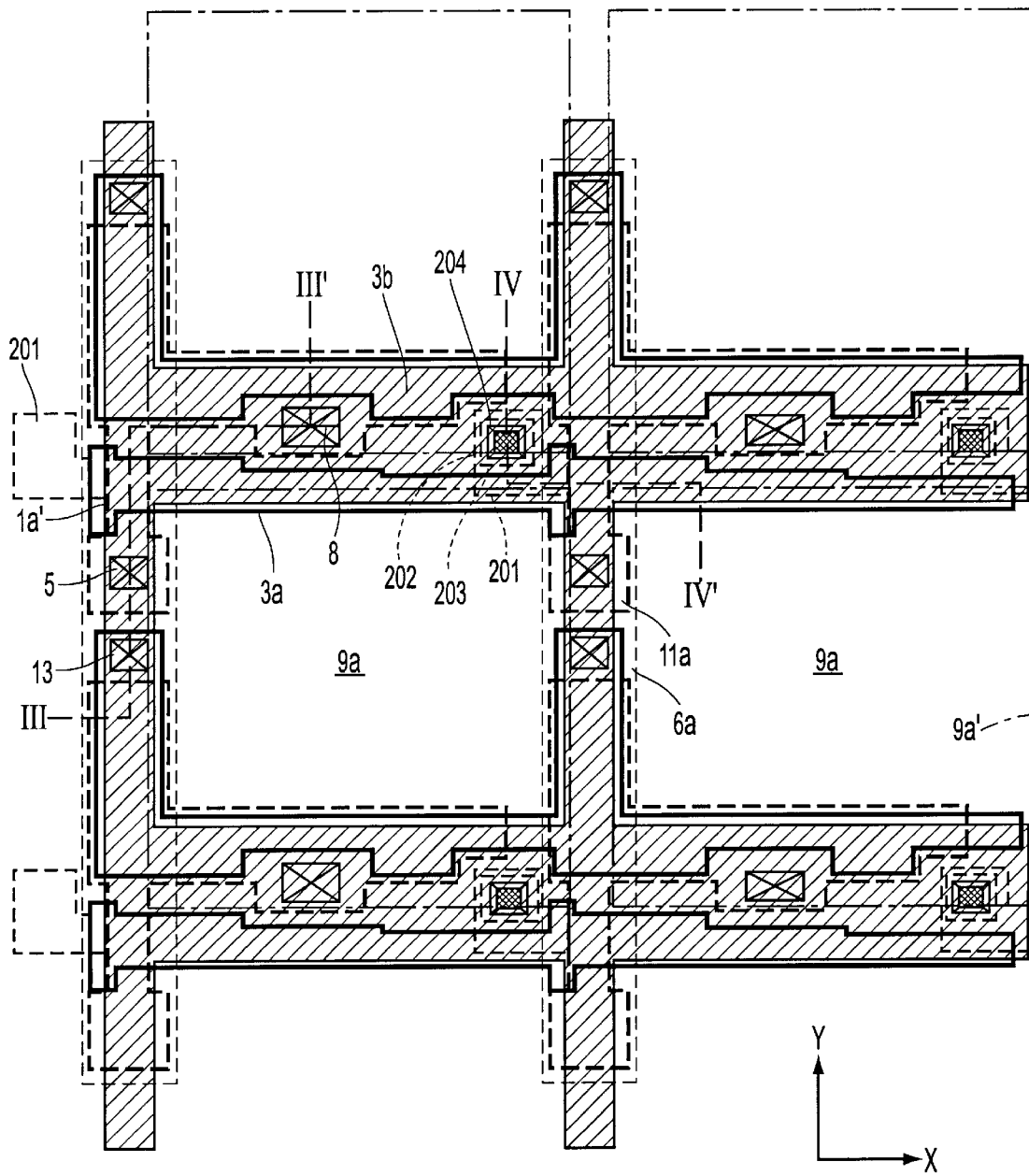
FIG. 23 is an exemplary plan view of a plurality of adjacent pixel groups in an TFT array substrate in which data lines, scanning lines, light-shielding layers, etc are formed in the liquid-crystal display device in accordance with a second exemplary embodiment of the present invention.
Figure 24:
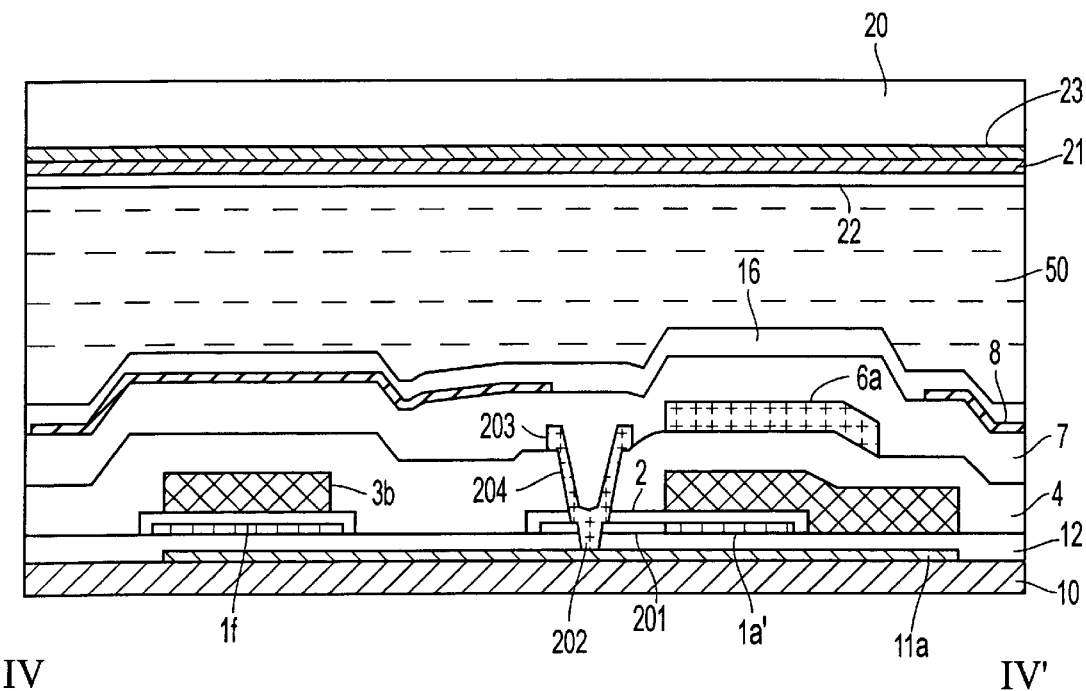
FIG. 24 is an exemplary cross-sectional view taken along line IV–IV' in FIG. 23.

An exemplary liquid-crystal display device in accordance with a second embodiment of the present invention is now discussed, referring to FIG. 23 and FIG. 24.

In the first exemplary embodiment shown in FIG. 2, FIG. 4, and FIG. 5, the contact hole 204 is formed in the extension portion 201 to fix the potential of the channel region 1a' of the semiconductor layer 1a. Further, the contact hole 202 is formed outside the extension portion immediately over the first light-shielding layer 11a, and the interconnect line 203 is arranged to connect the contact holes 202 and 204.

Referring to FIG. 23 and FIG. 24, in contrast, in this exemplary embodiment, the contact hole 202 leading to the first light-shielding layer 11a wholly or in part shares the area thereof with the contact hole 204 formed in the extension portion. It is recommended that the contact hole 202 be formed through two steps, i.e., one step of etching the extension portion 201 of the semiconductor layer, and the other step of etching the first interlayer insulator 12. The remaining structure and the manufacturing method remain unchanged from those in the first exemplary embodiment, except for the formation position of the contact hole 202. Referring to FIG. 23 and FIG. 24, elements identical to those described with reference to FIG. 2, FIG. 4, and FIG. 5 are designated with the same reference numerals, and the discussion thereof is skipped.

With the above arrangement, the channel region 1a' is fixed to the potential of the first light-shielding layer 11a via the extension portion 201. Since the two contact holes 202 and 204 share the area thereof in common, the area occupied by the contact holes and the interconnect line for connecting the extension portion 201 to the first light-shielding layer 11a is small compared with the first embodiment. A reduction in the wiring area in the pixel matrix area substantially contributes to the improvement of the aperture ratio, which greatly affects the utilization of light in the exemplary liquid-crystal display device. In this way, this embodiment controls degradation in transistor characteristics due to the substrate floating effect while providing a significant benefit from improving the aperture ratio. A liquid-crystal display device substrate exhibiting an excellent image quality is thus provided.

Third Embodiment

An exemplary liquid-crystal display device in accordance with a third exemplary embodiment of the present invention is now discussed, referring to FIG. 25 through FIG. 29(C).

In the first exemplary embodiment shown in FIG. 2, FIG. 4, and FIG. 5, the contact hole 204 is formed in the extension portion 201 to fix the potential of the channel region 1a' of the semiconductor layer 1a. Further, the contact hole 202 is formed outside the extension portion immediately over the first light-shielding layer 11a, and the interconnect line 203 is arranged to connect the contact holes 202 and 204.

Figure 25:
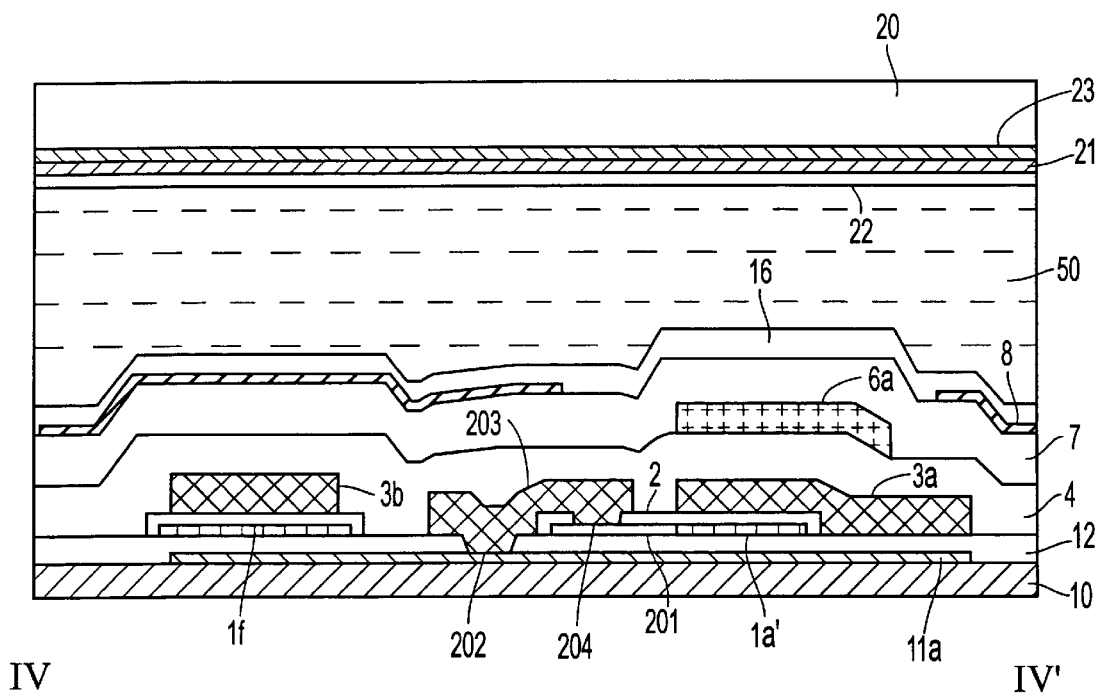
FIG. 25 is an exemplary cross-sectional view showing the structure of an interconnect line for fixing the potential of a channel region in a pixel matrix area in a TFT array substrate in which data lines, scanning lines, light-shielding layers, etc are formed in the liquid-crystal display device in accordance with a third exemplary embodiment of the present invention.
Figure 26:
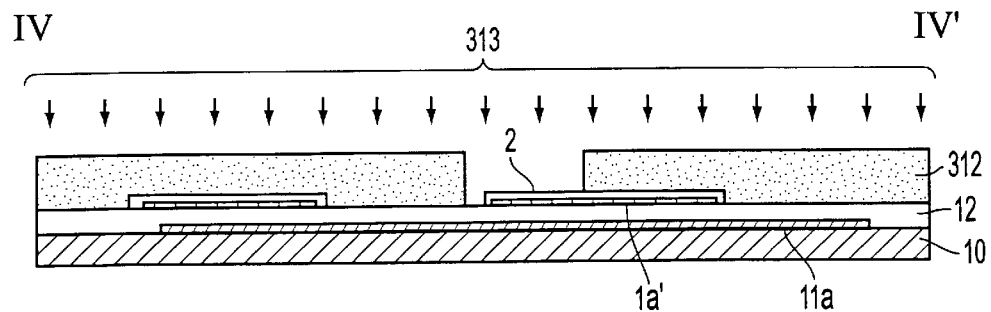
FIGS. 26(A)–26(F) are exemplary cross-sectional views successively showing an exemplary manufacturing process of the exemplary liquid-crystal display device.
Figure 26:
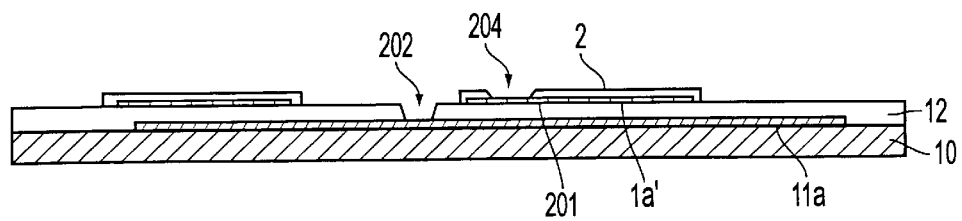
Figure 26:
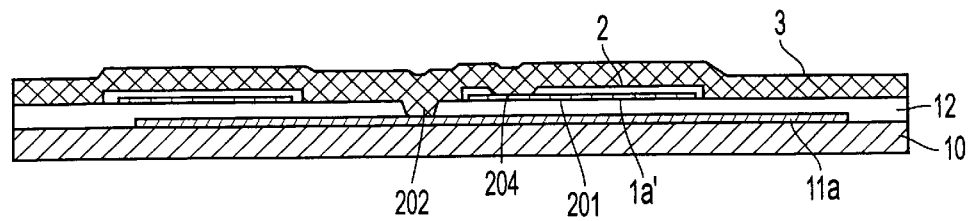
Figure 26:
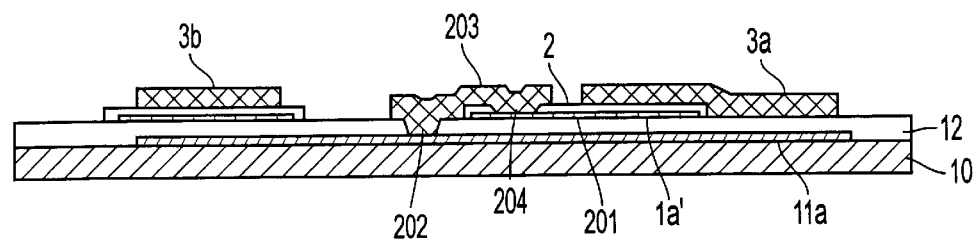
Figure 26:
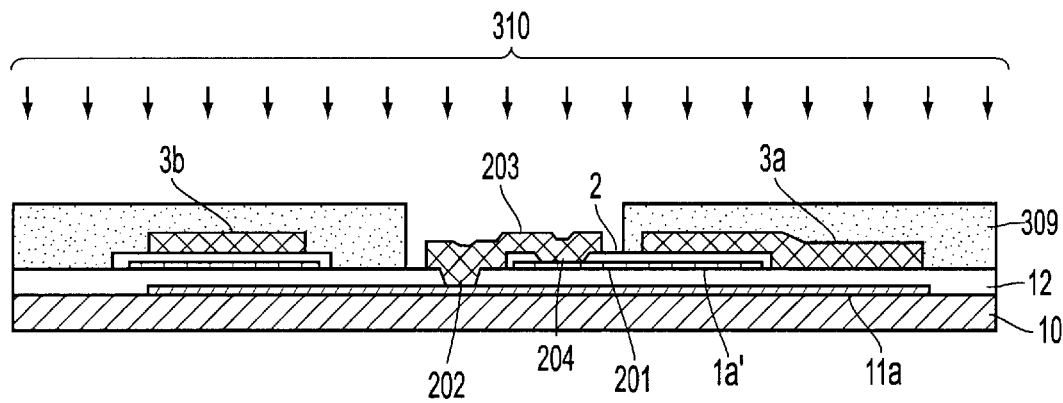
Figure 26:
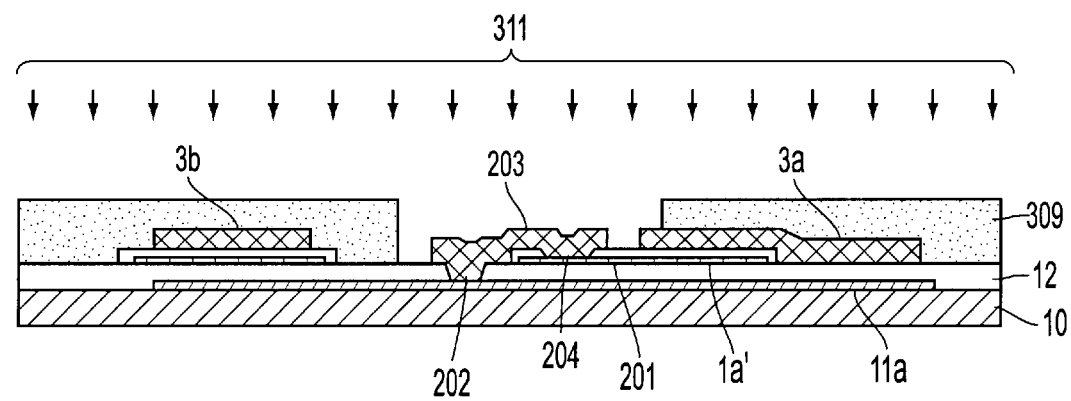
Figure 27:
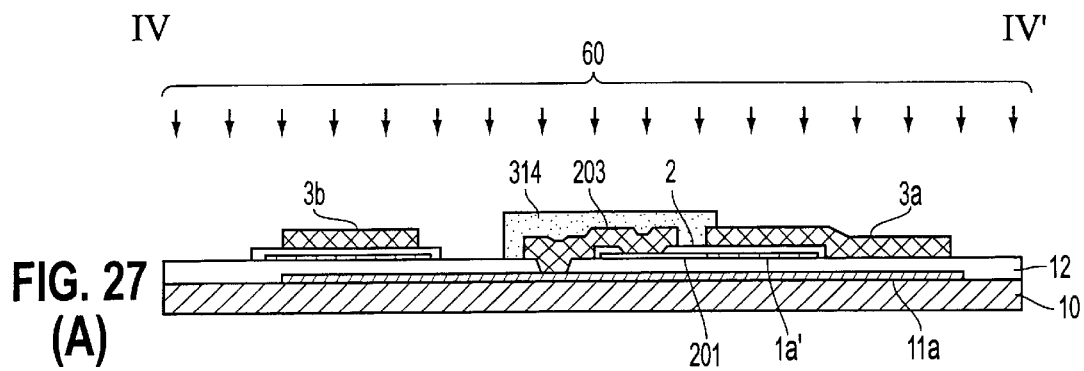
FIGS. 27(A)–27(D) are exemplary cross-sectional views successively showing an exemplary manufacturing process of the exemplary liquid-crystal display device.
Figure 27:
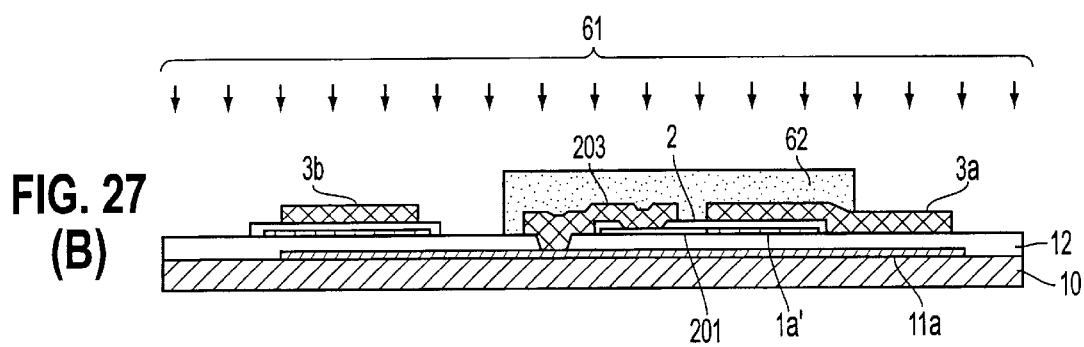
Figure 27:
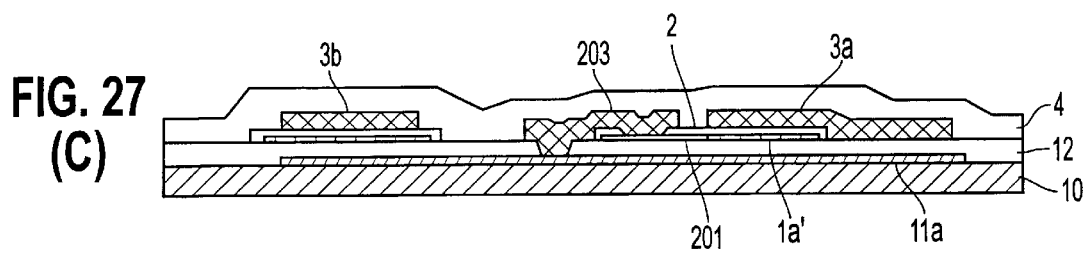
Figure 27:
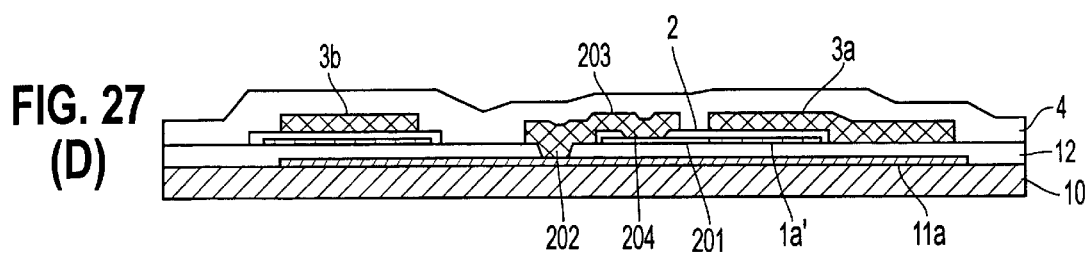

In contrast, in the exemplary embodiment as shown in FIG. 25, the interconnect line 203 for connecting the extension portion 201 and the light-shielding layer 11a is constructed of the same wiring layer as the one for the scanning line 3a. The manufacturing process of a liquid-crystal display device having this structure is illustrated in FIG. 26(A) through FIG. 29(C). Although the manufacturing process of this exemplary embodiment is basically identical to the already-described manufacturing process of the exemplary liquid-crystal display device of the first exemplary embodiment, there are still several differences in the manufacturing steps from the first exemplary embodiment. FIG. 26(A) through FIG. 29(C) show different steps from those of the first exemplary embodiment. Referring to these figures, the different steps are discussed. The manufacturing process of this exemplary embodiment is identical to that of the first embodiment in the step shown in FIG. 17(A) through the step shown in FIG. 18(D), and the discussion thereof is thus skipped.

In this exemplary embodiment, in succession to the step in FIG. 18(D) for imparting low resistance to the storage capacitor electrode by the introduction of impurity, in a step shown in FIG. 26(A), a resist 312 is formed in a region other than the extension portion 201 for higher electrical conductivity, and the region is heavily doped with a group III dopant with the resist 312 used as a mask (for instance, at a dose of $2e^{15}/cm^2$ of $BF_2$ ions at an acceleration voltage of 90 keV).

Referring to a step shown in FIG. 26(B), the contact hole 202 leading to the first light-shielding layer 11a and the contact hole 204 leading to the extension portion 201 of the semiconductor layer 1a are formed through a dry etching process such as a reactive etching or a reactive ion beam etching, or a wet etching process.

Referring to a step shown in FIG. 26(C), the polysilicon layer 3 is deposited to a thickness within a range from 350 to 550 nm through the reduced pressure CVD method. With the thickness of the gate electrode region of the scanning line more than 350 nm, the wiring resistance is reduced, and a reduction, due to a delay along the wiring, in signal write speed to write a signal to the pixel is sufficiently controlled. With the thickness of the gate electrode region of the scanning line less than 550 nm, the step of the element substrate attributed to the thickness of the gate electrode is controlled to the minimum possible height. As a result, disclination with the liquid crystal alignment is controlled, and the image quality is maintained. In addition to the polysilicon layer 3, an electrically conductive metal layer may be added, thereby heightening electrical conductivity.

Referring to a step shown in FIG. 26(D), the interconnect line 203 is formed along with the predetermined scanning line 3a and the capacitive line 3b through a photolithographic process, an etching process, etc., using a resist mask. Polysilicon left on the back side of the substrate 10 is removed through etching with the front side of the substrate 10 covered with a resist film.

Referring to a step shown in FIG. 26(E), an area corresponding to the N-channel semiconductor layer 1a is covered with a resist film 309 (the N-channel semiconductor layer 1a is shown in FIG. 26(E)) to form a P-channel LDD region in the semiconductor layer 1a, and is lightly doped with a group III dopant 310 such as B with the scanning line (gate electrode) 3a used as a diffusion mask (for instance, at a dose of $3e^{13}/cm^2$ of $BF_2$ ions at an acceleration voltage of 90 keV). The P-channel lightly doped source region 1b and lightly doped drain region 1c are thus formed. The extension portion 201 and the interconnect line 203 of the semiconductor layer 1a remain uncovered with the resist 309 and are lightly doped with a group III element.

Referring to a step shown in FIG. 26(F), the P-channel heavily doped source region 1d and P-channel heavily doped drain region 1e are formed in the semiconductor layer 1a. With the area corresponding to the N-channel semiconductor layer 1a covered with the resist film 309 and with a resist film (not shown) as a mask wider in width than the scanning line 3a formed on the scanning line 3a corresponding to the P-channel, the substrate 10 is heavily doped with a group III dopant 311 such as B (for instance, at a dose of $2e^{15}/cm^2$ of $BF_2$ ions at an acceleration voltage of 90 keV). The extension portion 201 and the interconnect line 203 of the semiconductor layer 1a remain uncovered with the resist 309 and are heavily doped with a group III element.

Referring to a step shown in FIG. 27(A), the N-channel LDD regions are formed in the semiconductor layer 1a. The substrate 10 is lightly doped with a group V dopant 60 such as P with an area corresponding to the P-channel semiconductor layer 1a covered with a resist film (not shown) and with the scanning line 3a (gate electrode) used as a diffusion mask (for instance, at a dose of $6e^{12}/cm^2$ of P ions at an acceleration voltage of 70 keV). The N-channel lightly doped source region 1b and lightly doped drain region 1c are thus formed. The extension portion 201 of the semiconductor layer 1a is also masked with the resist.

Referring to a step shown in FIG. 27(B), the N-channel heavily doped source region 1d and heavily doped drain region 1e are formed in the semiconductor layer 1a. After a resist film 62 having a width wider than that of the scanning line 3a is formed to cover the scanning line 3a and the extension portion 201 corresponding to the N-channel, the substrate 10 is heavily doped with a group V dopant 61 such as P (for instance, at a dose of $4e^{15}/cm^2$ of P ions at an acceleration voltage 70 keV).

Referring to a step shown in FIG. 27(C), the second interlayer insulator 4, fabricated of a silicate glass film such as NSG, PSG, BSG, or BPSG, a silicon nitride film, or a silicon oxide film, is formed using TEOS gas or the like through an atmospheric CVD method or a reduced pressure CVD method. The thickness of the second interlayer insulator 4 falls within a range from 600 to 1500 nm, and preferably is approximately 800 nm.

An annealing process is performed at about 85° C. for 20 minutes to activate the heavily doped source region 1*d* and the heavily doped drain region 1*e*.

Referring to a step shown in FIG. 27(D), the contact hole 5 (see FIG. 3) leading to the data line 6*a* is formed through a dry etching process such as a reactive etching or a reactive ion beam etching, or a wet etching process. Contact holes for connecting the scanning line 3*a* and the capacitive line 3*b* to unshown wirings are drilled in the second interlayer insulator 4 at the same step as that for the contact hole 5.

Figure 28A:
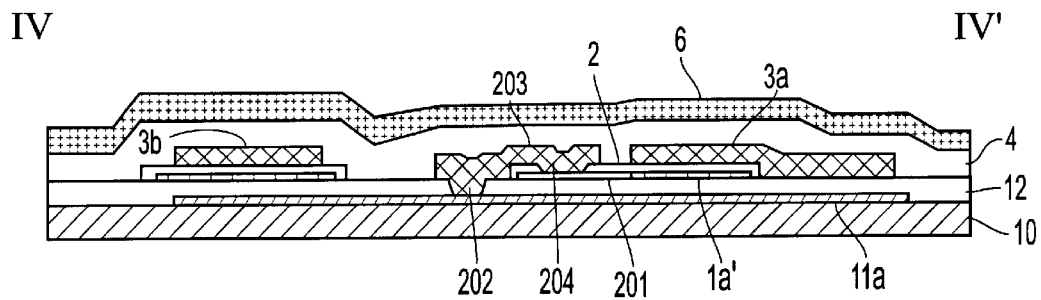
FIGS. 28(A)–28(C) are exemplary cross-sectional views successively showing an exemplary manufacturing process of the exemplary liquid-crystal display device.
Figure 28B:
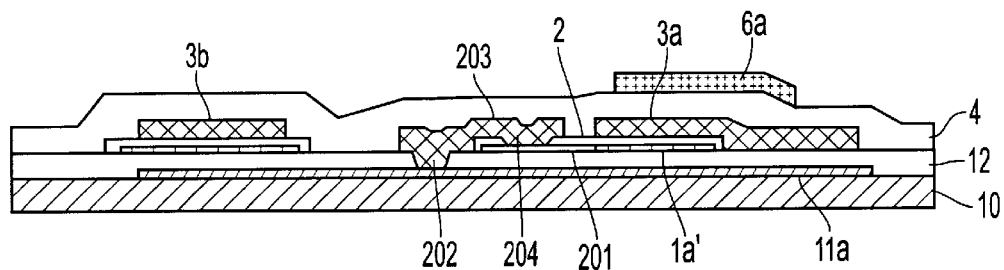

Referring to a step shown in FIG. 28(A), a metal layer 6, fabricated of a low-resistance metal having light-shielding property such as Al, or metal silicide, is formed on the second interlayer insulator 4 to a thickness within a range from 100 to 700 nm, preferably to a thickness of about 350 nm, through a sputtering process. Referring to a step shown in FIG. 28(B), the data line 6*a* is formed through the photolithographic process, the etching process, etc.

Figure 28C:
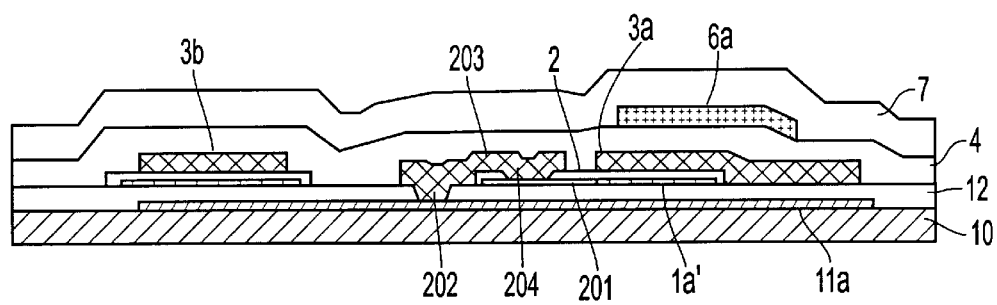

Referring to a step shown in FIG. 28(C), using TEOS gas through an atmospheric CVD method or a reduced pressure CVD method, the third interlayer insulator 7, fabricated of a silicate glass film such as NSG, PSG, BSG, or BPSG, a silicon nitride film, or a silicon oxide film, is formed to cover the data line 6*a*. The thickness of the third interlayer insulator 7 falls within a range from 600 to 1500 nm, and preferably is approximately 800 nm.

Figure 29A:
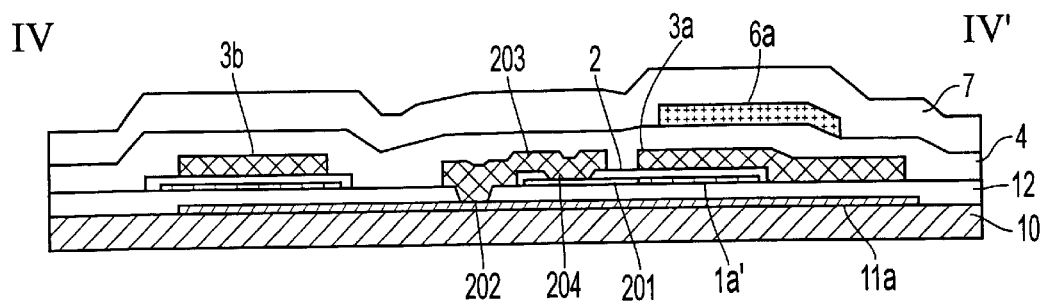
FIGS. 29(A)–29(C) are exemplary cross-sectional views successively showing an exemplary manufacturing process of the exemplary liquid-crystal display device.

Referring to a step shown in FIG. 29(A), the contact hole 8 for electrically connecting the pixel electrode 9*a* to the heavily doped drain region 1*e* in the pixel switching TFT 30 is formed through a dry etching process such as a reactive etching or a reactive ion beam etching.

Figure 29B:
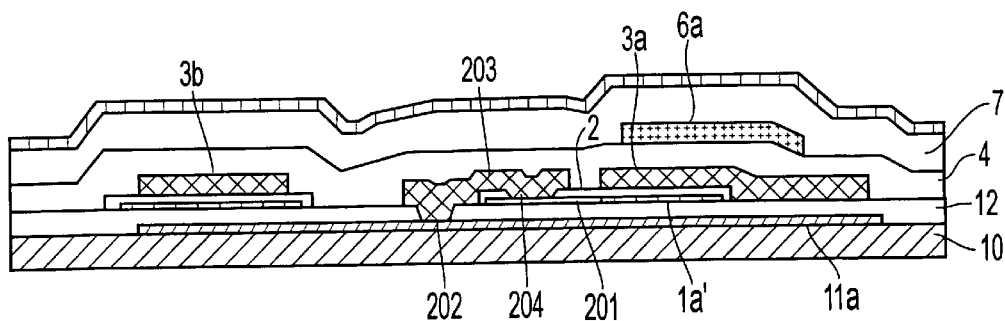
Figure 29C:
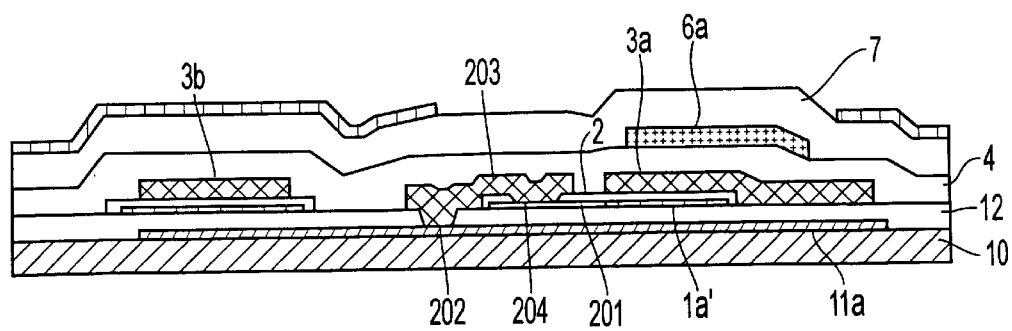

Referring to a step shown in FIG. 29(B), the transparent, electrically conductive layer 9 such as an ITO layer is formed on the third interlayer insulator 7 to a thickness within a range of 50 to 200 nm through sputtering process. Referring to a step shown in FIG. 29(C), the pixel electrode 9*a* is formed through the photolithographic process, the etching process, etc. When the exemplary liquid-crystal display device is of a reflective type, the pixel electrode 9*a* may be fabricated of an opaque material, such as Al, having a high reflectivity.

The remaining exemplary construction and exemplary manufacturing method remain unchanged from those of the first exemplary embodiment, and in FIG. 25, like components are identified with like reference numerals, and the discussion thereof is not repeated.

In the third exemplary embodiment as well, the channel region 1*a'* is fixed to the potential of the first light-shielding layer 11*a* via the extension portion 201. Like the construction of the second exemplary embodiment, the third exemplary embodiment minimizes the area occupied by the contact holes and the interconnect line while improving the aperture ratio of the pixel matrix area. Further, this exemplary embodiment controls degradation in transistor characteristics due to the substrate floating effect. A liquid-crystal display device substrate exhibiting an excellent image quality is thus provided.

Figure 30:
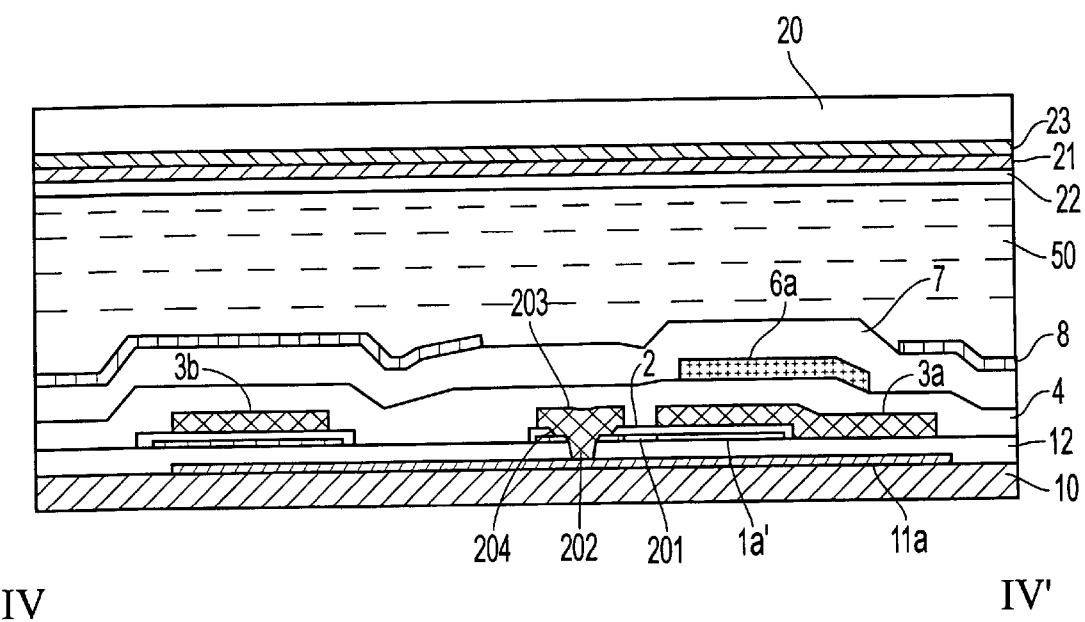
FIG. 30 is an exemplary cross-sectional view showing the structure of an interconnect line for fixing the potential of a channel region in a pixel matrix area in a TFT array substrate in which data lines, scanning lines, light-shielding layers, etc are formed in an exemplary liquid-crystal display device in accordance with a fourth exemplary embodiment of the present invention.

A liquid-crystal display device of a fourth embodiment of the present invention is discussed, referring to FIG. 30.

In the third embodiment shown in FIG. 25, the contact hole 204 is formed in the extension portion 201 to fix the potential of the channel region 1*a'* of the semiconductor layer 1*a*. The contact hole 202 is formed outside the extension portion immediately over the first light-shielding layer 11*a*, and the interconnect line 203, manufactured of the same layer as that for the scanning line, is arranged to connect the contact holes 202 and 204.

In contrast, in this exemplary embodiment as shown in FIG. 30, the contact hole 202 leading to the first light-shielding layer 11*a* wholly or in part shares the area thereof with the contact hole 204 formed in the extension portion. It is recommended that the contact hole 202 be formed through two steps, i.e., one step of etching the extension portion 201 of the semiconductor layer, and the other step of etching the first interlayer insulator 12. The remaining exemplary structure and the exemplary manufacturing method remain unchanged from those in the third exemplary embodiment, except for the formation position of the contact hole 202. Referring to FIG. 30, elements identical to those described with reference to FIG. 25 are designated with the same reference numerals, and the discussion thereof is skipped.

In the fourth exemplary embodiment as well, the channel region 1*a'* is fixed to the potential of the first light-shielding layer 11*a* via the extension portion 201. Like the construction of the second exemplary embodiment, the fourth exemplary embodiment minimizes the area occupied by the contact holes and the interconnect line while improving the aperture ratio of the pixel matrix area. Further, this exemplary embodiment controls degradation in transistor characteristics due to the substrate floating effect. A liquid-crystal display device substrate exhibiting an excellent image quality is thus provided.

Figures 13, 14:
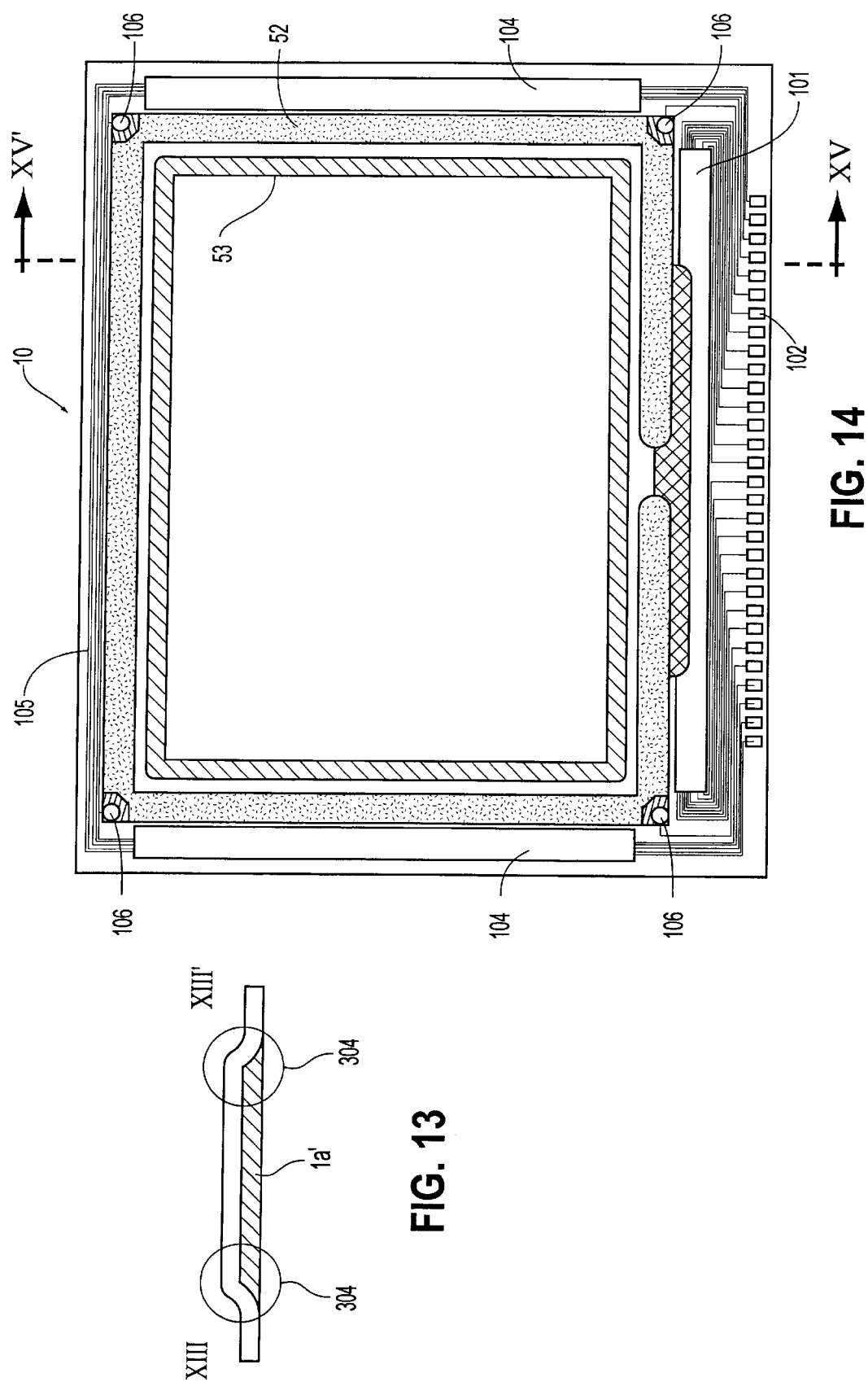
FIG. 13 is an exemplary cross-sectional view taken along line XIII–XIII' in FIG. 12.
FIG. 14 is an exemplary plan view showing the TFT array substrate with components formed thereon, in a liquid-crystal display device, viewed from a counter substrate.
Figure 15:
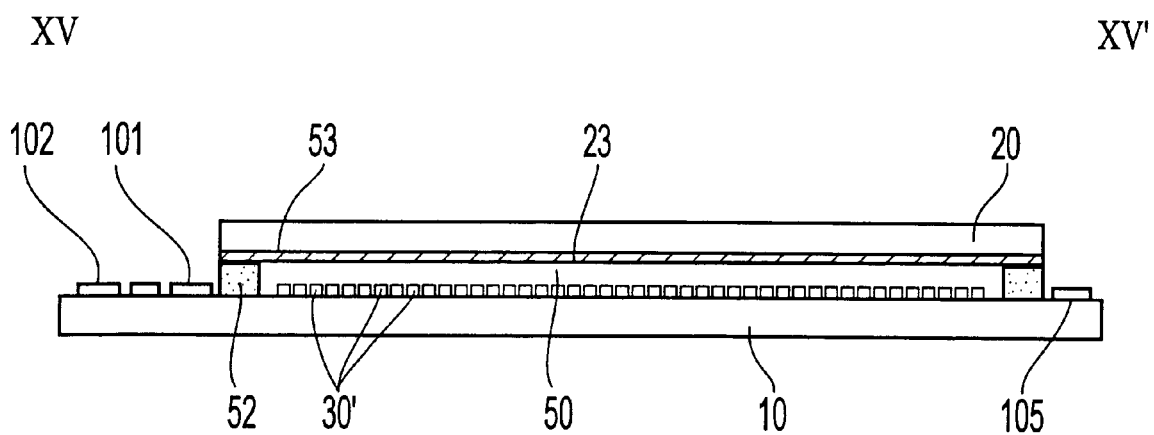
FIG. 15 is an exemplary cross-sectional view taken along line XV–XV' in FIG. 14.

An exemplary general construction of the exemplary liquid-crystal display device of the above embodiments is now discussed, referring to FIG. 14 and FIG. 15. FIG. 14 is an exemplary plan view of the TFT array substrate 10 with components arranged thereon, viewed from the counter substrate 20, and FIG. 15 is an exemplary cross-sectional view of the exemplary liquid-crystal display device including the counter substrate 20, taken along line XV–XV' in FIG. 14.

Referring to FIG. 14, the TFT array substrate 10 is provided with a sealing material 52 along the edge thereof, and a second light-shielding layer 53 as a display peripheral outline, fabricated of the same material as that of the light-shielding layer 23, or fabricated of a different material, extends along the internal edge of the sealing material 52. A data-line drive circuit 101, and external-circuit interconnect terminals 102 are arranged on one side of the TFT array substrate 10, external to the area of the sealing material 52, and scanning-line drive circuits 104 is arranged on two sides of the first side of the TFT array substrate 10. If a delay in the scanning signal supplied to the scanning line 3*a* presents no problem, the scanning-line drive circuit 104 may be mounted on one side only. Data-line drive circuits 101 may be arranged on both sides of the image display area. For instance, odd data lines 6*a* may be supplied with the video signal by the data-line drive circuit arranged on one side of the image display area, and even data lines 6*a* may be supplied with the video signal by the data-line drive circuit arranged on the opposite side of the image display area. If the data lines 6*a* are driven in an interdigital fashion in this way, the area occupied by the data-line drive circuits 101 is expanded, and a complex circuit may be incorporated therewithin. Arranged on the remaining one side of the image display area of the TFT array substrate 10 is a plurality of lines 105 for connecting the scanning-line drive circuits 104 mounted on both sides of the image display area. A conductive material 106 for electrically connecting the TFT array substrate 10 to the counter substrate 20 is mounted on at least one corner of the counter substrate 20. Referring to FIG. 15, the counter substrate 20 having almost the same outline as that of the sealing material 52 shown in FIG. 13 is bonded to the TFT array substrate 10 through the sealing material 52.

A test circuit for checking the quality and defects of the exemplary electro-optical device in the middle of the production or at the shipment thereof may be arranged on the TFT array substrate 10. The data-line drive circuit 101 and the scanning-line drive circuit 104 may be electrically and mechanically connected to a driver LSI mounted on a TAB (Tape Automated Bonding board), through an anisotropically electrically conductive film arranged about the TFT array substrate 10, rather than mounting the data-line drive circuit 101 and the scanning-line drive circuit 104 on the TFT array substrate 10. Arranged on the light incident side of the counter substrate 20 and the light exit side of the TFT array substrate 10 are respectively polarizer films, retardation films, and polarizer means in predetermined directions to work with operation modes such as a TN (twisted nematic) mode, an STN (super TN) mode, or a D-STN (dual-scan STN) mode, and normally white mode/normally black modes.

When the liquid-crystal display of each of the above exemplary embodiments is incorporated in a color liquid-crystal projector (a projection-type display device), three panels of the electro-optical devices are used as RGB light valves, and each light valve receives the respective color light separated through RGB color separating dichroic mirrors. In each of the above exemplary embodiments, the counter substrate 20 is equipped with no color filter. Optionally, an RGB color filter may be arranged in a predetermined area facing the pixel electrode 9*a* having no light-shielding layer 23, on the counter substrate 20 along with a protective film. In this way, the exemplary liquid-crystal display device of each embodiment finds applications in a direct viewing or reflective type color liquid-crystal television, besides the liquid-crystal projector. Microlenses may be arranged on the counter substrate 20 on a one microlens to one pixel basis. In this way, condensation efficiency of the incident light is increased, and a liquid-crystal display device providing a bright image results. By laminating interference layers having different refractive indexes on the counter substrate 20, a dichroic filter for creating the RGB colors is formed taking advantage of interference of light. The counter substrate equipped with such a dichroic filter makes an even brighter liquid-crystal display device.

In the exemplary liquid-crystal display device of each of the above-referenced exemplary embodiments, light is incident on the counter substrate 20 as in the conventional art. Since the TFT array substrate 10 is equipped with the first light-shielding layer 11*a,* incident light may be introduced to the TFT array substrate 10 with the counter substrate 20 emitting exit light. The exemplary liquid-crystal display device, incorporated in a liquid-crystal projector, prevents light from entering the channel region 1*a'* and the LDD regions 1*b* and 1*c,* thereby presenting a high-quality image. Conventionally, polarizer means having an AR (anti-reflection) coating thereon or an AR film needs to be bonded to the back of the TFT array substrate 10 to prevent reflection on the back. In the above exemplary embodiments, however, the first light-shielding layer 11*a* is arranged between the surface of the TFT array substrate 10 and at least the channel region 1*a'* of the semiconductor layer 1*a,* and the LDD regions 1*b* and 1*c*. There is no need for the polarizer means with the AR coating, or AR film, or a AR-processed TFT array substrate 10. Since no polarizer means is used in the above embodiments, material costs are reduced, and the device is free from dirt and scratches, which might be introduced if the polarizer means were introduced, and the production yield is maintained. Since the device of the above embodiments offers a high light fastness, image defects such as cross talk will not occur even when a bright light source is used or even when light utilization is increased through polarization by a polarizing beam splitter. In the transistor fabricated of a monocrystal silicon layer, having a high drive power capability, the substrate floating effect could lower the source-drain withstand voltage. In this exemplary embodiment, however, the channel region of the transistor is provided with an extension portion to electrically connect the channel region to the light-shielding layer. No such problem occurs. The exemplary liquid-crystal display device is thus stabilized and improved in electrical characteristics.

Figure 16:
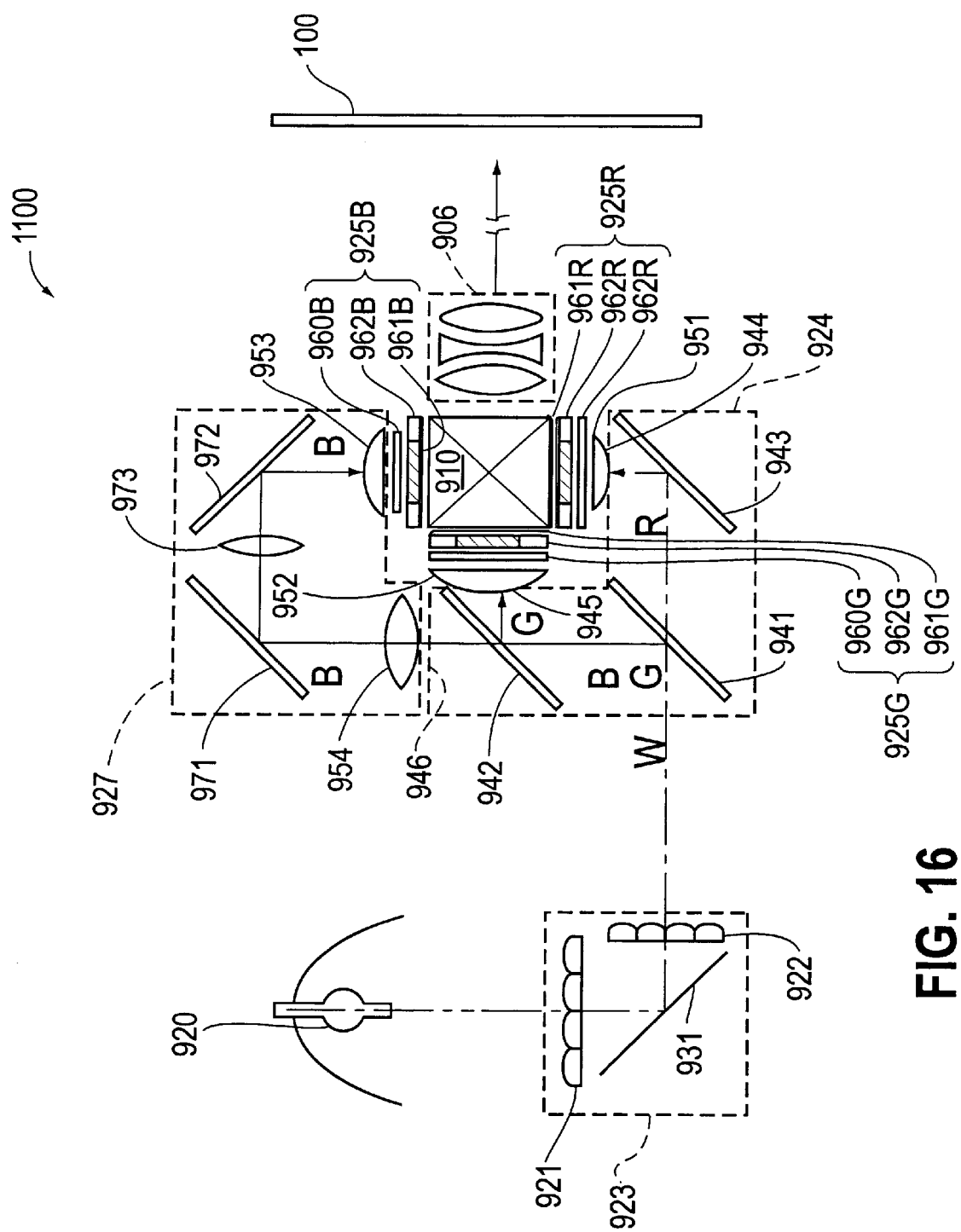
FIG. 16 is a diagram showing a projection-type display apparatus as one example of electronic equipment incorporating the liquid-crystal display device.

An exemplary projection-type display apparatus, as an example of the electronic device incorporating the exemplary liquid-crystal display device of the above embodiments, is now discussed, referring to FIG. 16. FIG. 16 is an exemplary diagrammatic view generally showing an optical system of the exemplary projection-type display apparatus 1100 which includes the three of the above-referenced liquid-crystal display devices 962R, 962G, and 962B for the RGB colors. The optical system of the exemplary projection-type display apparatus includes a light source 920 and a uniform illumination optical system 923. The exemplary projection-type display apparatus includes a color separating optical system 924 as color separating means for separating the luminous flux W from the uniform illumination optical system 923 into red (R), green (G) and blue (B) luminous fluxes, three light valves 925R, 925G, and 925B as modulator means for modulating the three luminous fluxes R, G, and B, a color synthesizing prism 910 as color synthesizing means for synthesizing the modulated color luminous fluxes, and a projection lens unit 906 as projection means for enlarging and projecting the synthesized luminous fluxes on the surface of a projection screen 100. Also arranged is a light guide system 927 that guides the blue luminous flux B to the light valve 925B.

The uniform illumination optical system 923 includes two lens assemblies 921 and 922, and a reflective mirror 931. The reflective mirror 931 subtends a right angle that the two lens assemblies 921 and 922 make. Each of the two lens assemblies 921 and 922 of the uniform illumination optical system 923 includes a matrix of rectangular lenses. The luminous flux emitted from the light source 920 is divided into a plurality of partial luminous fluxes through the rectangular lenses of the first lens assembly 921. The partial luminous fluxes are superimposed in the vicinities of the three light valves 925R, 925G, and 925B through the second lens assembly 922. With the uniform illumination optical system 923, the three light valves 925R, 925G, and 925B are uniformly illuminated even when the light source 920 gives a nonuniform output luminous flux in the cross section thereof.

The color separating optical system 924 includes a blue/green-reflecting dichroic mirror 941, a green-reflecting dichroic mirror 942, and a reflective mirror 943. The blue luminous flux B and the green luminous flux G contained in the luminous flux W are first reflected at a right angle off the blue/green-reflecting dichroic mirror 941 toward the green-reflecting mirror 942. The red luminous flux R passes through the blue/green-reflecting dichroic mirror 941, is reflected at a right angle off the reflective mirror 943, and reaches the prism unit 910 via the exit section 944 for the red luminous flux R.

The green luminous flux G only out of the blue and green luminous fluxes B and G reflected off the mirror 941 is reflected at a right angle off the green-reflecting mirror 942, and is delivered out toward the color synthesis system via the exit section 495 for the green luminous flux. The blue luminous flux B passing through the mirror 942 is delivered toward the light guide system 927 via the exit section 946 for the blue luminous flux B. In this exemplary embodiment, the distances from the exit section of the luminous flux W of the illumination optical system respectively to the exit sections 944, 945, and 946 in the color separating optical system 924 are set to be substantially equal.

Condenser lenses 951 and 952 are respectively arranged to the exit sides of the exit sections 944 and 945 for the red R and green G colors in the color separating optical system 924. These color luminous fluxes from the respective exit sections are therefore collimated through the condenser lenses 951 and 952.

The red and green luminous fluxes R, G, collimated in this way, are respectively introduced to the liquid-crystal light valves 925R and 925G to be modulated there. Video information for each color is thus imparted to the respective luminous fluxes. Specifically, the exemplary liquid-crystal display devices are controlled in response to video information by unshown drive means, and each color light passing therethrough is thus modulated.

The blue luminous flux B, on the other hand, is guided to the liquid-crystal light valve 925B via the light guide system 927 and is similarly modulated in response to the video information. The liquid-crystal light valves 925R, 925G and 925B are respectively composed of light entrance polarizer units 960R, 960G, and 960B, light exit polarizer units 961R, 961G, and 961B, and liquid-crystal display devices 962R, 962G, and 962B respectively interposed therebetween.

The light guide system 927 includes a condenser lens 954 arranged on the exit side of the exit section 946 for the blue luminous flux B, an entrance reflective mirror 971, an exit reflective mirror 972, an intermediate lens 973 disposed between these mirrors, and a condenser lens 953 disposed in front of the exemplary liquid-crystal display device 925B. The blue luminous flux B from the condenser lens 946 is introduced into the light valve 962B via the light guide system 927. Among the lengths of the optical paths of the color luminous fluxes from the light exit section for the luminous flux W to the respective liquid-crystal display devices 962R, 962G, and 962B, the length of the optical path of the blue luminous flux B is the longest, and thus the blue luminous flux suffers a maximum loss. By arranging the light guide system 927, however, the light loss the blue luminous flux suffers is controlled.

The color luminous fluxes R, G and B modulated through the respective liquid-crystal light valves 925R, 925G, and 925B are introduced into the prism unit 910 to be synthesized there. A color image synthesized by the prism unit 910 is enlarged and projected through a projection lens unit 906 to a screen 100 at a predetermined position.

Since the light-shielding layers are arranged beneath the TFTs in the exemplary liquid-crystal display devices 962R, 962G, and 962B, the channels of the pixel switching TFTs are sufficiently light-shielded even if the TFT array substrate is subject to incident light such as returning light. The returning light may be projection light from the exemplary liquid-crystal display devices 962R, 962G, and 962B and reflected from the projection optical system in the liquid-crystal projector, light reflected from the surface of the TFT array substrate when the projection light passes therethrough, or part of the projection light that has passed through the projection optical system after passing through another liquid-crystal display device.

In an exemplary projection optical system having a prism unit appropriate for compact design, there is no need for a returning light prevention film between each of the exemplary liquid-crystal display devices 962R, 962G, and 962B and the prism unit, or no need for a returning light prevention process on the polarizer unit. The construction of the device is thus advantageously miniaturized and simplified.

Since the above exemplary embodiments control the effect of the returning light on the TFT channel regions, the device does not require the polarizer unit 961R, 961G, and 961B with the returning light prevention processed. Referring to FIG. 16, the polarizer unit may be arranged separately from the exemplary liquid-crystal display device. Specifically, the polarizer units 961R, 961G, and 961B are glued onto the prism unit 910, and the polarizer units 960R, 960G, and 960B are glued onto the condenser lenses 953, 945, and 944. With the polarizer unit glued onto the prism unit or the condenser lenses, the heat of the polarizer unit sinks in the prism unit or the condenser lenses, and a rise in the temperature of the exemplary liquid-crystal display device is thus prevented.

Since the exemplary liquid-crystal display device and the polarizer units are separately formed, an air layer, though not shown, takes place between the exemplary liquid-crystal display device and the polarizer units. A cooling device is arranged to send cooling air between the exemplary liquid-crystal display device and the polarizer unit, and a rise in the temperature of the exemplary liquid-crystal display device is controlled even further. An erratic operation due to the temperature rise of the exemplary liquid-crystal display device is thus prevented.

The above embodiments have been discussed in connection with the exemplary liquid-crystal display device. The present invention is not limited to these exemplary embodiments, and is applicable to an electro-optical device such as an electro-luminescence, a plasma display, etc.

The present invention thus prevents the source-drain withstand voltage of the transistor from being lowered by the substrate floating effect, thereby stabilizing and improving the electrical characteristics of the element.

What is claimed is:

1. An electro-optical device comprising, on a support substrate;

a plurality of scanning lines;

a plurality of data lines which intersects the plurality of scanning lines;

a transistor connected to each of the scanning lines and each of the data lines;

a pixel electrode connected to each transistor;

an insulator layer formed beneath a semiconductor layer of the transistor serving as a channel of the transistor; and an electrically conductive light-shielding layer formed between the insulator layer and the support substrate, an extension portion of the semiconductor layer serving as a channel of the transistor being electrically connected to the light-shielding layer, wherein the extension portion is connected to the light-shielding layer through an interconnect line that runs through a first contact hole formed in the extension portion and a second contact hole formed in the light-shielding layer.

2. An electro-optical device comprising, on a support substrate;
   a plurality of scanning lines;
   a plurality of data lines which intersects the plurality of scanning lines;
   a transistor connected to each of the scanning lines and each of the data lines;
   a pixel electrode connected to each transistor;
   an insulator layer formed beneath a semiconductor layer of the transistor serving as a channel of the transistor; and
   an electrically conductive light-shielding layer formed between the insulator layer and the support substrate, an extension portion of the semiconductor layer serving as a channel of the transistor being electrically connected to the light-shielding layer, wherein the extension portion is connected to the light-shielding layer through an interconnect line that runs through a first contact hole formed in the extension portion and a second contact hole that penetrates the extension portion in a region including the internal portion of the first contact hole and is formed in the light-shielding layer.

3. The electro-optical device according to claim 1, the interconnect line being fabricated of a layer forming the data line.

4. The electro-optical device according to claim 1, the interconnect line being fabricated of a layer forming the scanning line.

5. The electro-optical device according to claim 1, further comprising:
   a storage capacitor connected to the pixel electrode and formed of the semiconductor layer;
   a capacitive line fabricated of a layer forming the scanning line and running in parallel with the scanning line; and
   an insulator layer interposed between the semiconductor layer and the capacitive line, at least one of the scanning line and the capacitive line comprising a bypass path bypassing the interconnect line.

6. An electro-optical device comprising, on a support substrate;
   a plurality of scanning lines;
   a plurality of data lines which intersects the plurality of scanning lines;
   a transistor connected to each of the scanning lines and each of the data lines;
   a pixel electrode connected to each transistor;
   an insulator layer formed beneath a semiconductor layer of the transistor serving as a channel of the transistor; and
   an electrically conductive light-shielding layer formed between the insulator layer and the support substrate, an extension portion of the semiconductor layer serving as a channel of the transistor being electrically connected to the light-shielding layer, wherein the light-shielding layers of the transistors are electrically connected to each other in at least one of, a direction of the scanning line, a direction of the data line, and both the directions of the scanning line and the data line, and are supplied with a predetermined potential.

7. The electro-optical device according to claim 6, the predetermined potential provided to the light-shielding layer being not higher than a lowest potential applied to a source or a drain of the transistor when the transistor arranged over the light-shielding layer is an N-channel transistor.

8. The electro-optical device according to claim 6, the predetermined potential provided to the light-shielding layer being not lower than a highest potential applied to a source or a drain of the transistor when the transistor arranged over the light-shielding layer is a P-channel transistor.

9. An electro-optical device comprising, on a support substrate;
   a plurality of scanning lines;
   a plurality of data lines which intersects the plurality of scanning lines;
   a transistor connected to each of the scanning lines and each of the data lines;
   a pixel electrode connected to each transistor;
   an insulator layer formed beneath a semiconductor layer of the transistor serving as a channel of the transistor; and
   an electrically conductive light-shielding layer formed between the insulator layer and the support substrate, an extension portion of the semiconductor layer serving as a channel of the transistor being electrically connected to the light-shielding layer, wherein the semiconductor layer has a thickness ranging from 100 to 180 nm.

10. A manufacturing method for manufacturing an electro-optical device, comprising the steps of:
    fabricating a light-shielding layer on a substrate;
    fabricating an insulator layer on the light-shielding layer;
    fabricating, on the insulator layer, a semiconductor layer that forms a channel region of a transistor, an extension portion of the channel region, and one electrode of a storage capacitor; and
    interconnecting the extension portion of the channel region to the light-shielding layer.

11. The manufacturing method for manufacturing an electro-optical device according to claim 10, wherein the step of fabricating a semiconductor layer comprises:
    gluing a monocrystal silicon substrate onto the substrate; and
    forming the semiconductor layer of the monocrystal silicon layer by removing an unwanted portion from the glued monocrystal silicon substrate.

12. The manufacturing method for manufacturing an electro-optical device according to claim 10, wherein the step the step of interconnecting the extension portion of the channel region comprises connecting an interconnect line, which connects the extension portion to the light-shielding layer through a first contact hole formed in the extension portion and a second contact hole formed in the light-shielding layer, to the semiconductor layer through a third contact hole formed in the semiconductor layer.

13. The manufacturing method for manufacturing an electro-optical device according to claim 10, wherein the step of interconnecting the extension portion of the channel region comprises connecting an interconnect line, which connects the extension portion to the light-shielding layer through a first contact hole in the extension portion and a second contact hole that penetrates the extension portion in a region including the internal portion of the first contact hole and is formed in the light-shielding layer, to the semiconductor layer through a third contact hole formed in the semiconductor layer.

14. The manufacturing method for manufacturing an electro-optical device according to claim 10, wherein the step of interconnecting the extension portion of the channel region comprises fabricating, of a layer forming the scanning line, an interconnect line which interconnects the extension portion to the light-shielding layer through a first contact hole formed in the extension portion and a second contact hole formed in the light-shielding layer.

15. The manufacturing method for manufacturing an electro-optical device according to claim 10, wherein the step of interconnecting the extension portion of the channel region comprises fabricating, of a layer forming the scanning line, an interconnect line which connects the extension portion to the light-shielding layer through a first contact hole in the extension portion and a second contact hole that penetrates the extension portion in a region including the internal portion of the first contact hole and is formed in the light-shielding layer.

16. The electro-optical device according to claim 1, further comprising:
- a counter substrate opposing a surface of the support substrate where the semiconductor layer is formed; and
- an electro-optical material interposed between the support substrate and the substrate and driven by the transistor.

17. Electronic equipment, comprising:
- a light source;
- the electro-optical device according to claim 16 that modulates light incoming from the light source in response to image information; and
- a projection unit that projects the light modulated through the electro-optical device.

* * * * *